US008854298B2

(12) United States Patent
Osman et al.

(10) Patent No.: US 8,854,298 B2
(45) Date of Patent: Oct. 7, 2014

(54) SYSTEM FOR ENABLING A HANDHELD DEVICE TO CAPTURE VIDEO OF AN INTERACTIVE APPLICATION

(75) Inventors: Steven Osman, San Francisco, CA (US); Yunpeng Zhu, Foster City, CA (US); Jeffrey Roger Stafford, Redwood City, CA (US)

(73) Assignee: Sony Computer Entertainment Inc., Tokyo (JP)

(*) Notice: Subject to any disclaimer, the term of this patent is extended or adjusted under 35 U.S.C. 154(b) by 1025 days.

(21) Appl. No.: 12/903,161

(22) Filed: Oct. 12, 2010

(65) Prior Publication Data
US 2012/0086631 A1  Apr. 12, 2012

(51) Int. Cl.
*G09G 5/00* (2006.01)
*A63F 13/30* (2014.01)

(52) U.S. Cl.
CPC ......... *A63F 13/12* (2013.01); *A63F 2300/1093* (2013.01); *A63F 2300/6676* (2013.01); *A63F 2300/105* (2013.01); *A63F 2300/403* (2013.01); *A63F 2300/695* (2013.01)
USPC ............ 345/156; 345/158; 345/169; 345/173

(58) Field of Classification Search
CPC ... A63F 13/12; A63F 2300/403; A63F 13/10; A63F 2300/105; A63F 2300/1093; A63F 2300/301; A63F 2300/538; A63F 2300/632; A63F 2300/6676; A63F 2300/695
USPC .................. 345/156, 167–169, 173–184, 158
See application file for complete search history.

(56) References Cited

U.S. PATENT DOCUMENTS

| 2006/0038833 A1* | 2/2006 | Mallinson et al. ............. 345/633 |
| 2006/0073892 A1 | 4/2006 | Watanabe et al. |
| 2006/0223635 A1 | 10/2006 | Rosenberg |
| 2006/0284789 A1* | 12/2006 | Mullen ............................. 345/4 |

FOREIGN PATENT DOCUMENTS

| EP | 1713030 | 10/2006 |
| EP | 2359915 | 8/2011 |
| GB | 2442259 | 4/2008 |

OTHER PUBLICATIONS

Notification of Transmittal of International Search Report and Written Opinion issued in International Application No. PCT/US2011/056031, mailed Jun. 28, 2012 (11 total pages).

* cited by examiner

*Primary Examiner* — Srilakshmi K Kumar
*Assistant Examiner* — Insa Sadio
(74) *Attorney, Agent, or Firm* — Martine Penilla Group, LLP

(57) ABSTRACT

Methods and systems for enabling a handheld device to capture video of an interactive session of an interactive application presented on a main display are provided. An interactive session of the interactive application defines interactivity between a user and the interactive application. An initial position and orientation of a handheld device operated by a spectator are determined. A current state of the interactive application based on the interactivity between the user and the interactive application is determined. The position and orientation of the handheld device are tracked during the interactive session. A spectator video stream of the interactive session based on the current state of the interactive application and the tracked position and orientation of the handheld device is generated. The spectator video stream is rendered on a handheld display of the handheld device.

31 Claims, 14 Drawing Sheets

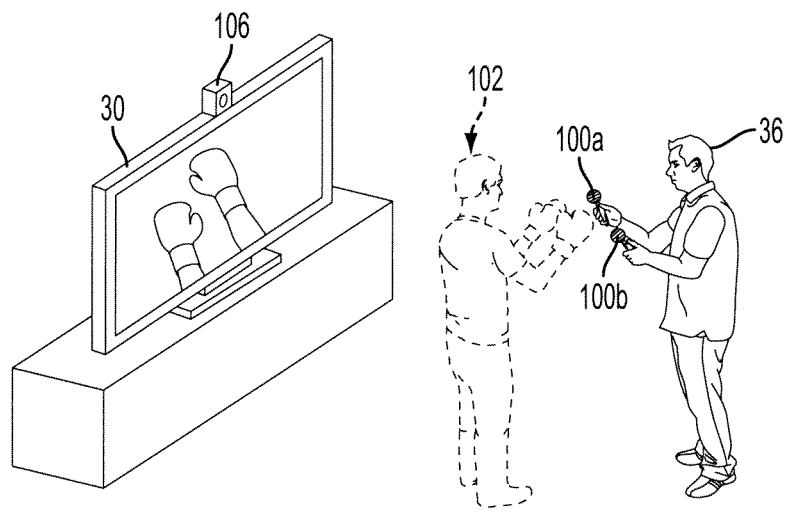
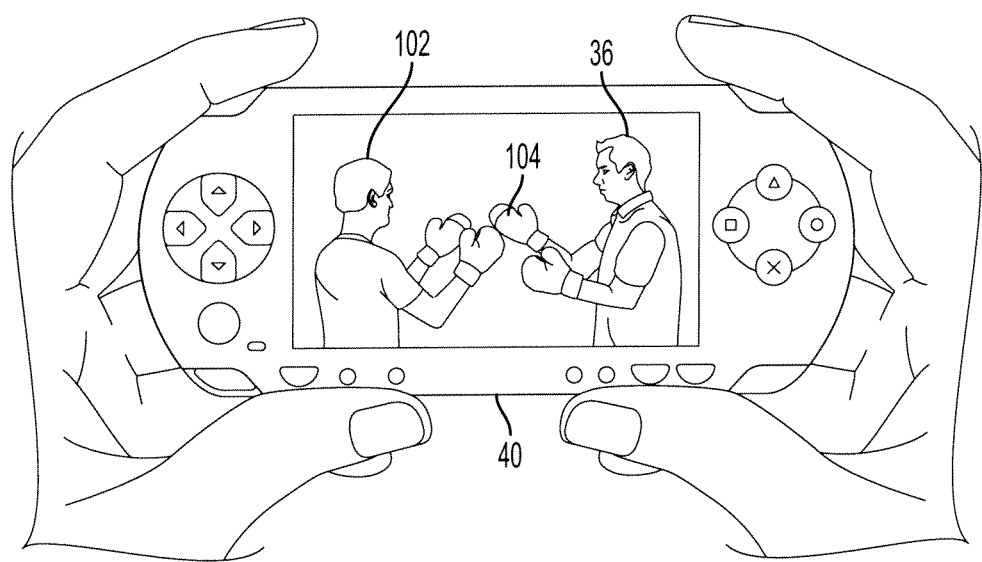
FIG. 6

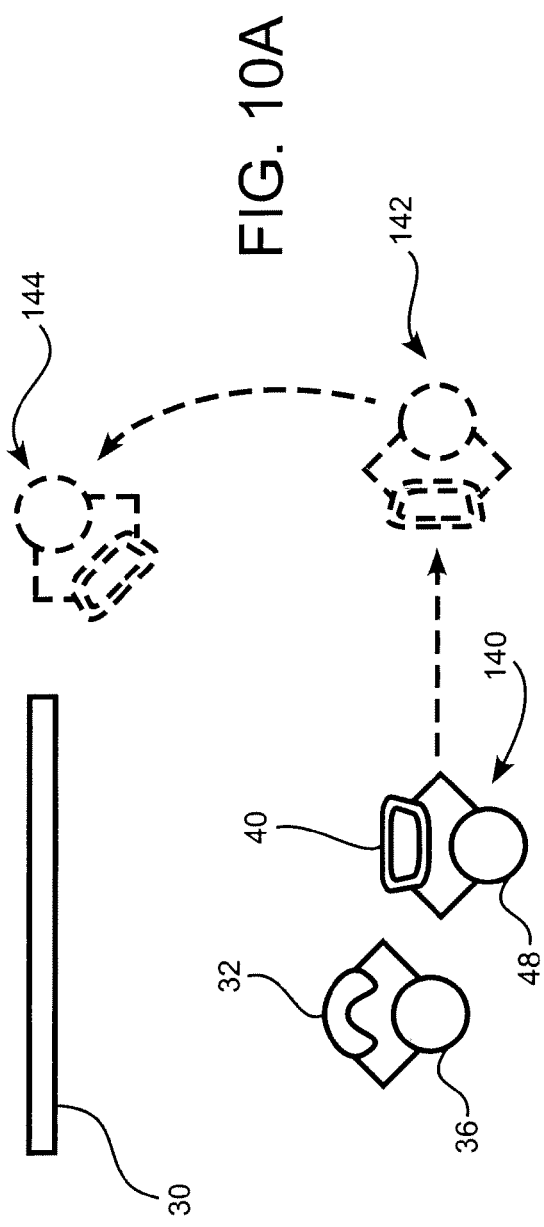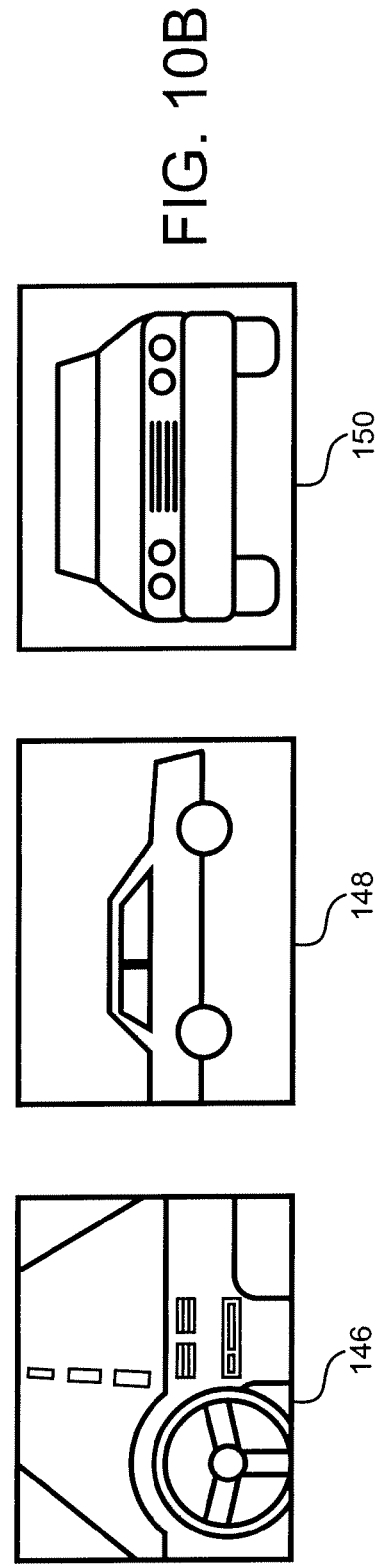

SYSTEM FOR ENABLING A HANDHELD DEVICE TO CAPTURE VIDEO OF AN INTERACTIVE APPLICATION

RELATED APPLICATIONS

This application is related to the U.S. patent application Ser. No. 12/903,123, entitled "USING A PORTABLE GAMING DEVICE TO RECORD OR MODIFY A GAME OR APPLICATION IN REAL-TIME RUNNING ON A HOME GAMING SYSTEM," filed on the same day as the instant application, the disclosure of which is herein incorporated by reference in its entirety.

BACKGROUND

1. Field of the Invention

The present invention relates to methods and systems for enabling interactivity with an interactive application.

2. Description of the Related Art

A growing segment of the video game industry involves the use of portable hand-held devices. Examples of such portable devices include dedicated gaming devices, such as those manufactured by Sony Computer Entertainment Inc. and others, as well as other types of portable devices such as smartphones, PDA's, digital multimedia players, etc. As the computing power of such portable devices has increased, so has the ability of the portable devices to handle increasingly complex programs and tasks.

For example, today's portable devices may include several different types of hardware integrated into a single device. Many such devices may include a color display, a camera, speakers, and an input mechanism such as buttons, a touchscreen or a stylus.

It is in this context that embodiments of the invention arise.

SUMMARY

Embodiments of the present invention provide methods and systems for enabling a handheld device to capture video of an interactive session of an interactive application presented on a main display. It should be appreciated that the present invention can be implemented in numerous ways, such as a process, an apparatus, a system, a device or a method on a computer readable medium. Several inventive embodiments of the present invention are described below.

In one embodiment, a method is provided for enabling a handheld device to capture video of an interactive session of an interactive application presented on a main display. According to the method, the interactive session of the interactive application is initiated, the interactive session defining interactivity between a user and the interactive application. Then, an initial position and orientation of a handheld device operated by a spectator is determined. A current state of the interactive application is determined based on the interactivity between the user and the interactive application, and the position and orientation of the handheld device is tracked during the interactive session. A spectator video stream of the interactive session is generated based on the current state of the interactive application and the tracked position and orientation of the handheld device. And the spectator video stream is rendered on a handheld display of the handheld device.

In one embodiment, the interactive session includes a method for the operation of receiving interactive input from a controller device operated by the user, the interactive input being utilized to determine the current state of the interactive application.

In one embodiment, an application video stream is generated based on the current state of the interactive application, and rendered on the main display. The interactive session defines interactivity between the user and the rendered application video stream.

In one embodiment, the position and orientation of the handheld device define a position and orientation of a virtual viewpoint within a virtual space defined by the interactive application. And the spectator video stream includes images of the virtual space captured from the perspective of the virtual viewpoint.

In one embodiment, the spectator video stream is transmitted from the interactive application to the handheld device so as to enable the rendering of the spectator video stream on the handheld display of the handheld device.

In one embodiment, application state data is determined based on the current state of the interactive application, and transmitted to the handheld device. The spectator video stream is generated at the handheld device based on the application state data and the tracked position and orientation of the handheld device.

In one embodiment, an environmental video stream is captured of an interactive environment in which the interactivity between the user and the interactive application occurs. The spectator video stream is generated based on the environmental video stream.

In one embodiment, the spectator video stream is generated by augmenting the environmental video stream with a virtual element.

In one embodiment, the generating of the spectator video stream includes method operations of detecting the user within the environmental video stream, and replacing at least a portion of the detected user in the environmental video stream with a virtual element. In one embodiment, the replacing includes replacing the detected user in the environmental video stream with a character of the interactive application controlled by the user.

In one embodiment, an initial position of the user is determined, and the position of the user is tracked during the interactive session. The spectator video stream is generated based on the position and orientation of the handheld device relative to the position of the user.

In one embodiment, an object within a virtual environment of the interactive application is mapped to the position of the user, wherein the position and orientation of the handheld device relative to the position of the user define a position and orientation of a virtual viewpoint within a virtual space defined by the interactive application. And the spectator video stream includes images of the virtual space captured from the perspective of the virtual viewpoint, the object being included in the images of the spectator video stream when the handheld device is oriented towards the position of the user. In one embodiment, the object is controlled by the user. In one embodiment, the object is a character of the interactive application. In another embodiment, the position of the user is determined based on the position of a controller device operated by the user.

In one embodiment, an environmental video stream is captured of an interactive environment in which the interactivity between the user and the interactive application occurs. The position of the user and the position and orientation of the handheld device relative to the position of the user are determined at least in part based on the environmental video stream.

In one embodiment, the spectator video stream is stored in a memory.

In another embodiment of the invention, a system for capturing video of an interactive session of an interactive application presented on a main display is provided. The system includes a console device for presenting the interactive application. The console device includes (i) a session module for initiating the interactive session of the interactive application, the interactive session defining interactivity between a user and the interactive application, (ii) a handheld device module for determining and tracking a position and orientation of a handheld device operated by a spectator during the interactive session, and (iii) a spectator video stream module for generating a spectator video stream of the interactive session based on a current state of the interactive application and the tracked position and orientation of the handheld device. The system further includes a handheld device, the handheld device including a handheld display for rendering the spectator video stream.

In one embodiment, the system includes a controller device operated by the user, the controller device providing interactive input, the interactive input being utilized to determine the current state of the interactive application.

In one embodiment, the console device further includes an application video stream module for generating an application video stream based on the current state of the interactive application and rendering the application video stream on the main display. And the interactive session defines interactivity between the user and the rendered application video stream.

In one embodiment, the position and orientation of the handheld device define a position and orientation of a virtual viewpoint within a virtual space defined by the interactive application. And the spectator video stream includes images of the virtual space captured from the perspective of the virtual viewpoint.

In one embodiment, the spectator video stream module transmits the spectator video stream from the interactive application to the handheld device so as to enable the rendering of the spectator video stream on the handheld display of the handheld device.

In one embodiment, the handheld device further includes an image capture device for capturing an environmental video stream of an interactive environment in which the interactivity between the user and the interactive application occurs. And the spectator video stream module generates the spectator video stream based on the environmental video stream.

In one embodiment, the spectator video stream module generates the spectator video stream by augmenting the environmental video stream with a virtual element.

In one embodiment, the spectator video stream module generates the spectator video stream by detecting the user within the environmental video stream, and replacing at least a portion of the detected user in the environmental video stream with a virtual element. In one embodiment, the replacing includes replacing the detected user in the environmental video stream with a character of the interactive application controlled by the user.

In one embodiment, the system further includes a user tracking module, the user tracking module determining an initial position of the user and tracking the position of the user during the interactive session. And the spectator video stream module generates the spectator video stream based on the position and orientation of the handheld device relative to the position of the user.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which:

FIG. 6 illustrates an interactive environment shown from the perspective of a spectator, in accordance with an embodiment of the invention.

FIG. 10A illustrates an overhead view of an interactive environment, in accordance with an embodiment of the invention.

FIG. 10B depicts scenes which illustrate the video which is displayed on a handheld device when a spectator is located at positions as shown in FIG. 10A.

DETAILED DESCRIPTION

The following embodiments describe methods and apparatus for a system that enables an interactive application to utilize the resources of a handheld device. In one embodiment of the invention, a primary processing interface is provided for rendering a primary video stream of the interactive application to a display. A first user views the rendered primary video stream on the display and interacts by operating a controller device which communicates with the primary processing interface. Simultaneously, a second user operates a handheld device in the same interactive environment. The handheld device renders an ancillary video stream of the interactive application on a display of the handheld device, separate from the display showing the primary video stream. Accordingly, methods and apparatus in accordance with embodiments of the invention will now be described.

It will be obvious, however, to one skilled in the art, that the present invention may be practiced without some or all of these specific details. In other instances, well known process operations have not been described in detail in order not to unnecessarily obscure the present invention.

Figure 1:
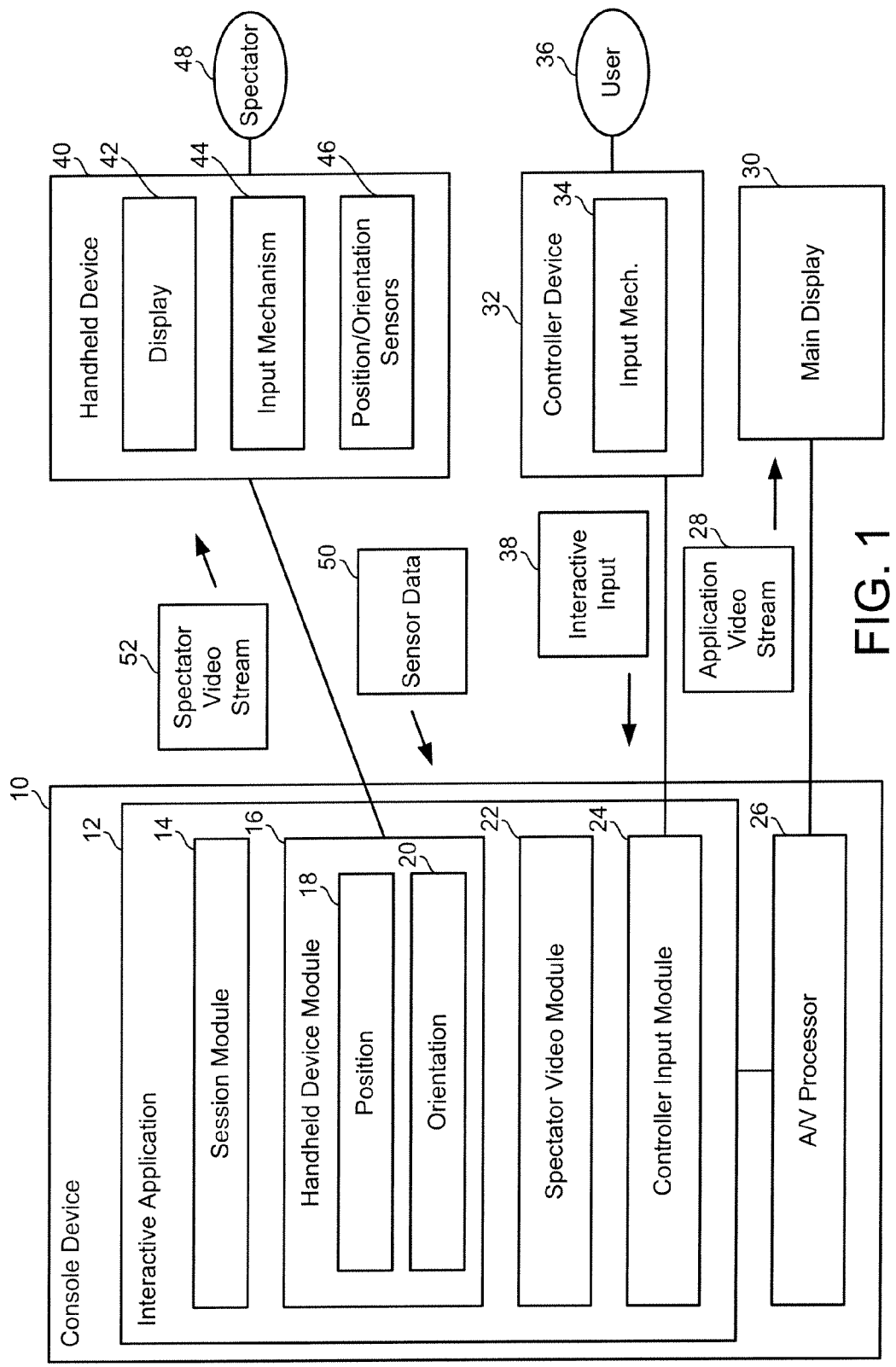
FIG. 1 illustrates a system for enabling a handheld device to capture video of an interactive session of an interactive application, in accordance with an embodiment of the invention

With reference to FIG. 1, a system for enabling a handheld device to capture video of an interactive session of an interactive application is shown, in accordance with an embodiment of the invention. The system exists in an interactive environment in which a user interacts with the interactive application. The system includes a console device 10, which executes an interactive application 12. The console device 10 may be a computer, console gaming system, set-top box, media player, or any other type of computing device that is capable of executing an interactive application. Examples of console gaming systems include the Sony Playstation 3® and the like. The interactive application 12 may be any of various kinds of applications which facilitate interactivity between one of more users' and the application itself. Examples of interactive applications include video games, simulators, virtual reality programs, utilities, or any other type of program or application which facilitates interactivity between a user and the application.

The interactive application 12 produces video data based on its current state. This video data is processed by an audio/video processor 26 to generate an application video stream 28. The application video stream 28 is communicated to a main display 30 and rendered on the main display 30. The term "video," as used herein, shall generally refer to a combination of image data and audio data which are synchronized, though in various embodiments of the invention, the term "video" may refer to image data alone. Thus, by way of example, the application video stream 28 may include both image data and audio data, or just image data alone. The main display may be a television, monitor, lcd display, projector, or any other kind of display device capable of visually rendering a video data stream.

The interactive application 12 also includes a controller input module 24 for communicating with a controller device 32. The controller device 32 may be any of various controllers which may be operated by a user to provide interactive input to an interactive application. Examples of controller devices include the Sony Dualshock 3® wireless controller. The controller device 32 may communicate with the console device 10 via a wireless or wired connection. The controller device 32 includes at least one input mechanism 34 for receiving interactive input from a user 36. Examples of input mechanisms may include a button, joystick, touchpad, touchscreen, directional pad, stylus input, or any other types of input mechanisms which may be included in a controller device for receiving interactive input from a user. As the user 36 operates the input mechanism 34, the controller device 32 generates interactive input data 38 which is communicated to the controller input module 24 of the interactive application 12.

The interactive application 12 includes a session module 14, which initiates a session of the interactive application, the session defining interactivity between the user 36 and the interactive application 12. For example, the initiated session of the interactive application may be a new session or a continuation of a previously saved session of the interactive application 12. As the interactive application 12 is executed and rendered on the main display 30 via the application video stream 28, the user 36 views the rendered application videos stream on the main display 30 and provides interactive input data 38 to the interactive application by operating the controller device 32. The interactive input data 38 is processed by the interactive application 12 to affect the state of the interactive application 12. The state of the interactive application 12 is updated, and this updated state is reflected in the application video stream 28 rendered to the main display 30. Thus, the current state of the interactive application 12 determined based on the interactivity between the user 36 and the interactive application 12 in the interactive environment.

The interactive application 12 also includes a handheld device module 16 for communicating with a handheld device 40. The handheld device 40 may be any of various handheld devices, such as a cellular phone, personal digital assistant (PDA), tablet computer, electronic reader, pocket computer, portable gaming device or any other type of handheld device capable of displaying video. One example of a handheld device is the Sony Playstation Portable®. The handheld device 40 is operated by a spectator 48, and includes a display 42 for rendering a spectator video stream 52. An input mechanism 44 is provided for enabling the user 48 to provide interactive input to the interactive application 12. Also, the handheld device 40 includes position and orientation sensors 46. The sensors 46 detect data which may be utilized to determine the position and orientation of the handheld device 40 within the interactive environment. Examples of position and orientation sensors include an accelerometer, magnetometer, gyroscope, camera, optical sensor, or any other type of sensor or device which may be included in a handheld device to generate data that may be utilized to determine the position or orientation of the handheld device. As the spectator 48 operates the handheld device 40, the position and orientation sensors 46 generate sensor data 50 which is transmitted to the handheld device module 16. The handheld device module 16 includes position module 18 for determining the position of the handheld device 40 within the interactive environment, and orientation module 20 for determining the orientation of the handheld device 40 within the interactive environment. The position and orientation of the handheld device 40 are tracked during the interactive session of the interactive application 12.

It will be understood by those skilled in the art that any of various technologies for determining the position and orientation of the handheld device 40 may be applied without departing from the scope of the present invention. For example, in one embodiment, the handheld device includes an image capture device for capturing an image stream of the interactive environment. The position and orientation of the handheld device 40 is tracked based on analyzing the captured image stream. For example, one or more tags may be placed in the interactive environment, and utilized as fiduciary markers for determining the position and orientation of the handheld device based on their perspective distortion when captured by the image capture device of the handheld device 40. The tags may be objects or figures, or part of the image displayed on the main display, that are recognized when present in the captured image stream of the interactive environment. The tags serve as fiduciary markers which enable determination of a location within the interactive environment. Additionally, the perspective distortion of the tag in the captured image stream indicates the position and orientation of the handheld device.

In other embodiments, any of various methods may be applied for purposes of tracking the location and orientation of the handheld device 40. For example, natural feature tracking methods or simultaneous location and mapping (SLAM) methods may be applied to determine position and orientation of the handheld device 40. Natural feature tracking methods generally entail the detection and tracking of "natural" features within a real environment (as opposed to artificially introduced fiducials) such as textures, edges, corners, etc. In other embodiments of the invention, any one or more image analysis methods may be applied in order to track the handheld device 40. For example, a combination of tags and natural feature tracking or SLAM methods might be employed in order to track the position and orientation of the handheld device 40.

Additionally, the movement of the handheld device 40 may be tracked based on information from motion sensitive hardware within the handheld device 40, such as an accelerometer, magnetometer, or gyroscope. In one embodiment, an initial position of the handheld device 40 is determined, and movements of the handheld device 40 in relation to the initial position are determined based on information from an accelerometer, magnetometer, or gyroscope. In other embodiments, information from motion sensitive hardware of the handheld device 40, such as an accelerometer, magnetometer, or gyroscope, may be used in combination with the aforementioned technologies, such as tags, or natural feature tracking technologies, so as to ascertain the position, orientation and movement of the handheld device 40.

The interactive application includes a spectator video module 22, which generates the spectator video stream 52 based on the current state of the interactive application 12 and the tracked position and orientation of the handheld device 40 in the interactive environment. The spectator video stream 52 is transmitted to the handheld device 40 and rendered on the display 42 of the handheld device 40.

In various embodiments of the invention, the foregoing system may be applied to enable the spectator 48 to capture video of an interactive session of the interactive application 12. For example, in one embodiment, the interactive application 12 may define a virtual space in which activity of the interactive session takes place. Accordingly, the tracked position and orientation of the handheld device 40 may be utilized to define a position and orientation of a virtual viewpoint within the virtual space that is defined by the interactive application. The spectator video stream 52 will thus include images of the virtual space captured from the perspective of the virtual viewpoint. As the spectator 48 maneuvers the handheld device 40 to different positions and orientations in the interactive environment, so the position and orientation of the virtual viewpoint will change, thereby changing the perspective in the virtual space from which the images of the spectator video stream 52 are captured, and ultimately displayed on the display 42 of the handheld device. In this manner, the spectator 48 can function as the operator of a virtual camera in the virtual space in an intuitive fashion— maneuvering the handheld device 40 so as to maneuver the virtual camera in the virtual space in a similar manner.

In an alternative embodiment, the spectator video stream is generated at the handheld device 40, rather than at the console device 10. In such an embodiment, application state data is first determined based on the current state of the interactive application 12. This application state data is transmitted to the handheld device 40. The handheld device 40 processes the application state data and generates the spectator video stream based on the application state data and the tracked position and orientation of the handheld device.

In another embodiment, an environmental video stream of the interactive environment is captured, and the spectator video stream 52 is generated based on the environmental video stream. The environmental video stream may be captured at a camera included in the handheld device 40. In one embodiment, the spectator video stream 52 is generated by augmenting the environmental video stream with a virtual element. In such an embodiment, wherein the environmental video stream is captured at the handheld device 40, then the spectator 48 is able to view an augmented reality scene on the display 42 of the handheld device 40 that is based on the current state of the interactive application 12 as it is affected by the interactivity between the user 36 and the interactive application 12. For example, in one embodiment, the image of the user 36 may be detected within the environmental video stream. And a portion of or the entirety of the user's image in the environmental video stream may then be replaced with a virtual element. In one embodiment, the detected user's image in the environmental video stream could be replaced with a character of the interactive application 12 controlled by the user 36. In this manner, when the spectator 48 aims the camera of the handheld device 40 at the user 36, the spectator 48 sees the character of the interactive application 12 which the user 36 is controlling instead of the user 36 on the display 42.

In another embodiment, the position and orientation of the controller 32 as it is operated by the user 36 may also be determined and tracked. The position and orientation of the controller 32, as well as the position and orientation of the handheld device 40 relative to the location of the controller 32, may be utilized to determine the spectator video stream. Thus, the location of the controller may be utilized as a reference point according to which the spectator video stream is determined based on the relative position and orientation of the handheld device 40 to the location of the controller 32. For example, the location of the controller 32 may correspond to an arbitrary location in a virtual space of the interactive application 12, such as the present location of a character controlled by the user 36 in the virtual space. Thus, as the spectator maneuvers the handheld device 40 in the interactive environment, its position and orientation relative to the location of the controller 32 determine the position and orientation of a virtual viewpoint in the virtual space relative to the location of the character. Images of the virtual space from the perspective of the virtual viewpoint may be utilized to form the spectator video stream. In one embodiment, the correspondence between the relative location of the handheld device 40 to the controller 32 and the relative location of the virtual viewpoint to the character is such that changes in the position or orientation of the handheld device 40 relative to the location of the controller 32 cause similar changes in the position or orientation of the virtual viewpoint relative to the location of the character. As such, the spectator 48 is able to intuitively maneuver the handheld device about the controller 36 to view and capture a video stream of the virtual space from various perspectives that are linked to the location of the character controlled by the user 36.

The foregoing embodiment has been described with reference to a character controlled by the user 36 in the virtual space of the interactive application 12. However, in other embodiments, the location of the controller 32 may correspond to any location, stationary or mobile, within the virtual space of the interactive application. For example, in some embodiments, the location of the controller may correspond to a character, a vehicle, a weapon, an object or some other thing which is controlled by the user 36. Or in some embodiments, the location of the controller may correspond to moving characters or objects which are not controlled by the user 32, such as an artificial intelligence character or a character being controlled by a remote user of the interactive application during the interactive session. Or in still other embodiments, the location of the controller 32 may correspond to a specific geographic location, the location of an object, or some other stationary article within the virtual space of the interactive application 12.

In another embodiment, an initial position of the user 36 is determined, and the position of the user 36 is tracked during the interactive session. The spectator video stream is then generated based on the position and orientation of the handheld device 40 relative to the position of the user 36. In various embodiments, the position of the user 36 may be determined based on various technologies. For example, an image capture device may be included in the interactive system for capturing images of the interactive environment including the user 36. These images may be analyzed to determine the location and pose of the user 36 in the interactive environment. In one embodiment, a depth camera capable of detecting depth data of the interactive environment is included in the interactive system. The depth data may be analyzed to detect the location and pose of the user 36 in the interactive environment. By determining the position and/or pose of the user in the interactive environment, various features in accordance with embodiments of the invention are enabled.

For example, in one embodiment an object within a virtual environment of the interactive application 12 is mapped to the position of the user 36. The position and orientation of the handheld device 40 relative to the position of the user 36 is utilized to define a position and orientation of a virtual viewpoint within the virtual space defined by the interactive application 12. The spectator video stream 52 thus includes images of the virtual space captured from the perspective of the virtual viewpoint, the object being included in the images of the spectator video stream when the handheld device 40 is oriented towards the position of the user 36. In one embodiment, the object is controlled by the user. Examples of such objects include a character, vehicle, weapon, or other type of article of the interactive application 12 which the user 36 may control. In one embodiment, the position of the user 36 is determined based on the position of the controller device 32 operated by the user.

In one embodiment, the spectator video stream 52 is stored in a memory. The memory may be included in the handheld device 40, the console device 10, or located remotely. After storing the spectator video stream 52, the spectator 48 will be able to perform operations such as editing the stored spectator video or uploading the stored spectator video to an Internet website for sharing the video.

Figure 2:
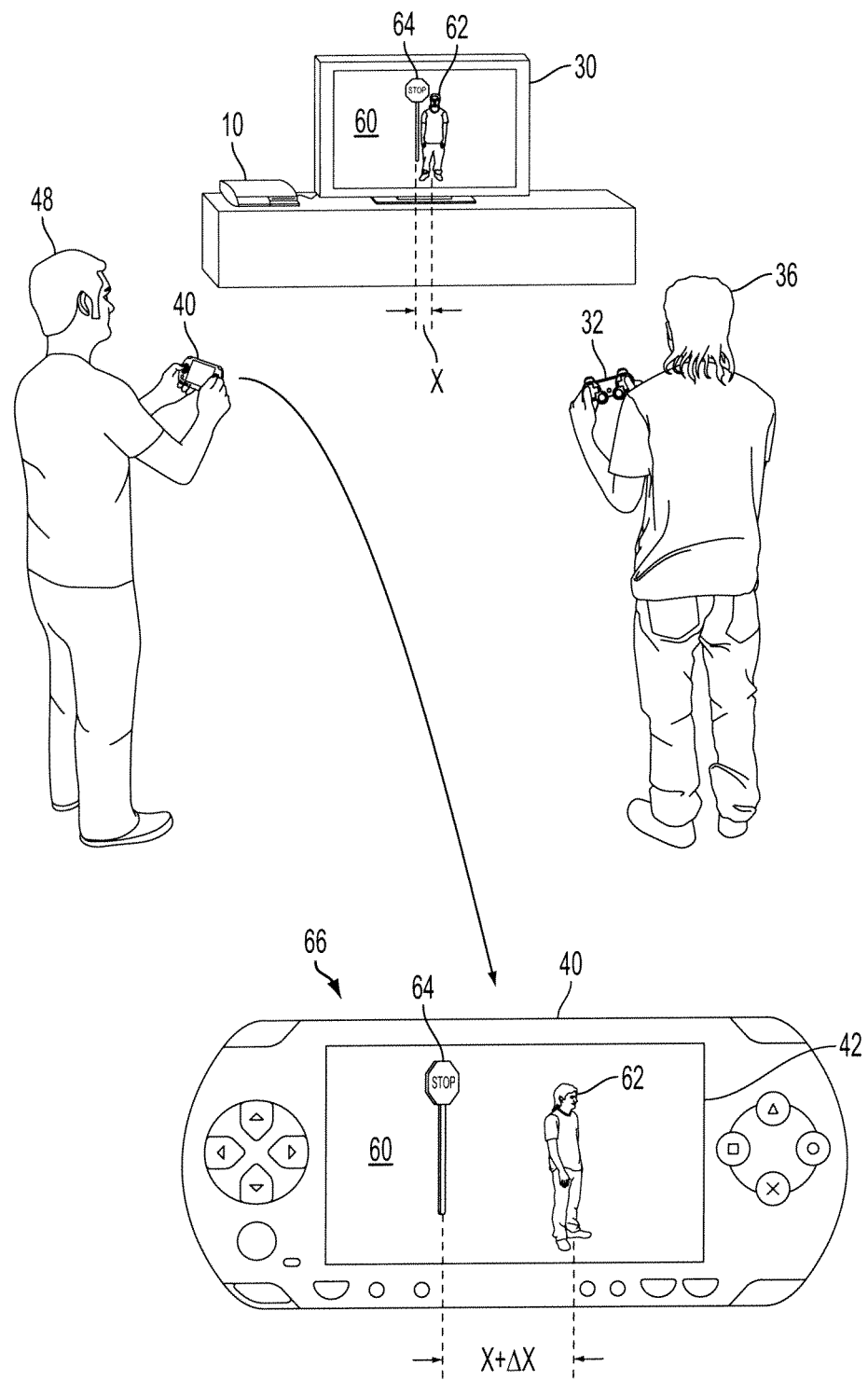
FIG. 2 illustrates an interactive environment including a user and a spectator interacting with an interactive application, in accordance with an embodiment of the invention.

With reference to FIG. 2, an interactive environment including a user and a spectator interacting with an interactive application is shown, in accordance with an embodiment of the invention. The interactive environment includes a console device 10 which executes an interactive application. As the interactive application executes, it generates an application video stream that is rendered on a main display 30. As shown by way of example only, the rendered application video stream depicts a scene 60 including a character 62 and a stop sign 64. A user 36 views the scene 60 and interacts with the interactive application by operating controller 32. Simultaneously, a spectator 48 views a display 42 of a handheld device 40. The application video stream rendered on the main display 30 depicts a view of a virtual space of the interactive application from the perspective of a primary virtual viewpoint defined with reference to the location of the user 36. The primary virtual viewpoint may be static, presuming the user 36 to be in an approximate location in front of the main display 30, or dynamic, changing based on changes in the position of the user 36. Simultaneously, the position and orientation of the handheld device 40 are determined and tracked, and utilized to define a secondary virtual viewpoint within the virtual space of the interactive application. This secondary virtual viewpoint is dynamically updated based on changes in the position and orientation of the handheld device 40 as it is operated by the spectator 48. A spectator video stream is rendered on the handheld device 40, depicting the virtual space from the perspective of the secondary virtual viewpoint.

In the embodiment shown, the virtual space includes the character 62 and the stop sign 64. The spectator 48 and handheld device 40 are situated to the left of the user 36, the spectator 48 orienting the handheld device 40 towards the apparent position of the scene 60. The position and orientation of the secondary virtual viewpoint based on the position and orientation of the handheld device 40 is thus similarly situated relative to the primary virtual viewpoint in the virtual space. As such, the spectator 40 views the scene 60 from a different perspective that is based on the position and orientation of the handheld device 40. As shown, the depiction of the scene 60 from the primary virtual viewpoint shows the character 62 having a horizontal separation from the stop sign of x. Whereas in the magnified view 66 of the handheld device 40, the scene 60 is shown depicted from the perspective of the secondary virtual viewpoint, such that the horizontal separation between the character 62 and the stop sign 64 is x+Δx. As can be seen, the horizontal separation of the character 62 and the stop sign 64 is increased in the spectator video stream rendered on the handheld device 40 because of the different location and orientation of the secondary virtual viewpoint relative to the primary virtual viewpoint. In this manner, the spectator 48 views the same scene as the user 36, but shown from a different virtual perspective in an intuitive manner as one would expect based on the relative positioning of the spectator 48 and the user 36.

Figure 3:
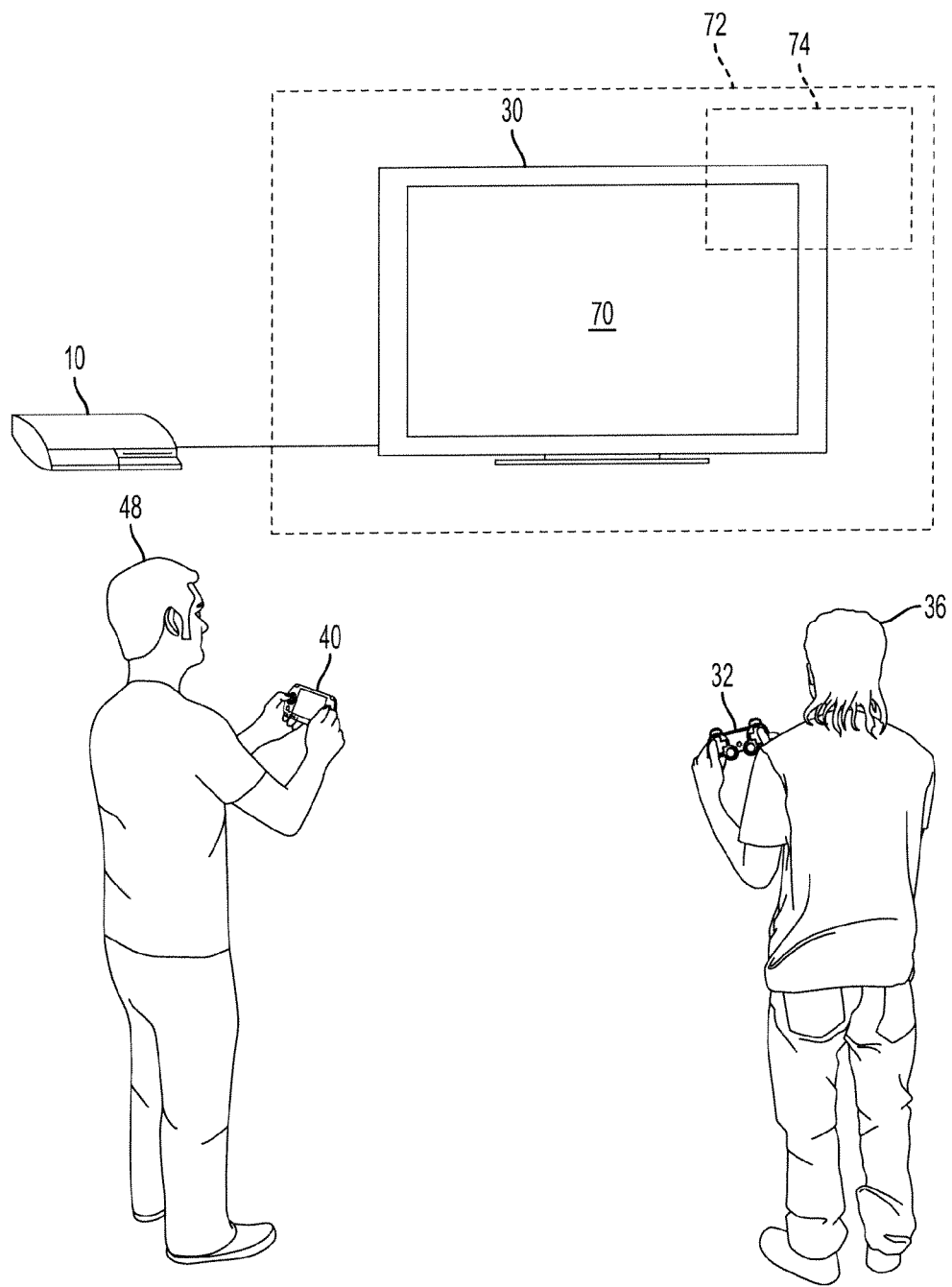
FIG. 3 illustrates an interactive environment including a user and a spectator interacting with an interactive application, in accordance with an embodiment of the invention.

With reference to FIG. 3, an interactive environment including a user 36 and a spectator 48 interacting with an interactive application is shown, in accordance with an embodiment of the invention. The user 36 operates a controller 32 to provide input to the interactive application. As shown, the interactive application generates an application video stream that is rendered on the display 30, based on the current state of the interactive application. As shown, the rendered application video stream depicts a scene 70. The scene 70 may be a view of a virtual space of the interactive application. In one embodiment, the spectator 48 is able to view an expanded area 72 of the scene 70 by utilizing the handheld device 40. For example, in one embodiment, the spectator may maneuver the handheld device so as to be directed towards a region 74 within the expanded area 72. The position and orientation of the handheld device are tracked so as to enable determination of the direction towards which the handheld device 40 is oriented. The region 74 is shown on the handheld device 40 for the spectator to view. In this way, the spectator 74 is able to view other portions of the scene 70 which the user 36 is not able to view because of the limited view which is shown on the display 30.

In another embodiment, the handheld device 40 initially renders a same image as that shown on the display 30. Then, the spectator 48 may view other regions of the expanded area 72, such as region 74, by providing input to the handheld device 40, such as by moving a joystick or touching and dragging a finger across a touchscreen of the handheld device 40 so as to move the view that is shown on the handheld device 40 to a different region. In a cooperative-style game, such a feature could be utilized to enable a spectator 48 to view regions of a virtual space which the user 36 is not presently viewing. The spectator 48 could communicate information based on what was viewed to the user 36 to aid the user 36 in the gameplay.

Figure 4A:
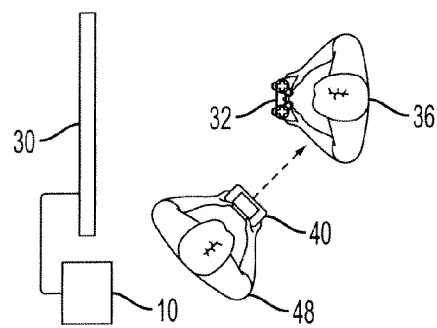
FIG. 4A illustrates a top view of an interactive environment including a user and a spectator interacting with an interactive application, in accordance with an embodiment of the invention.
Figure 4B:
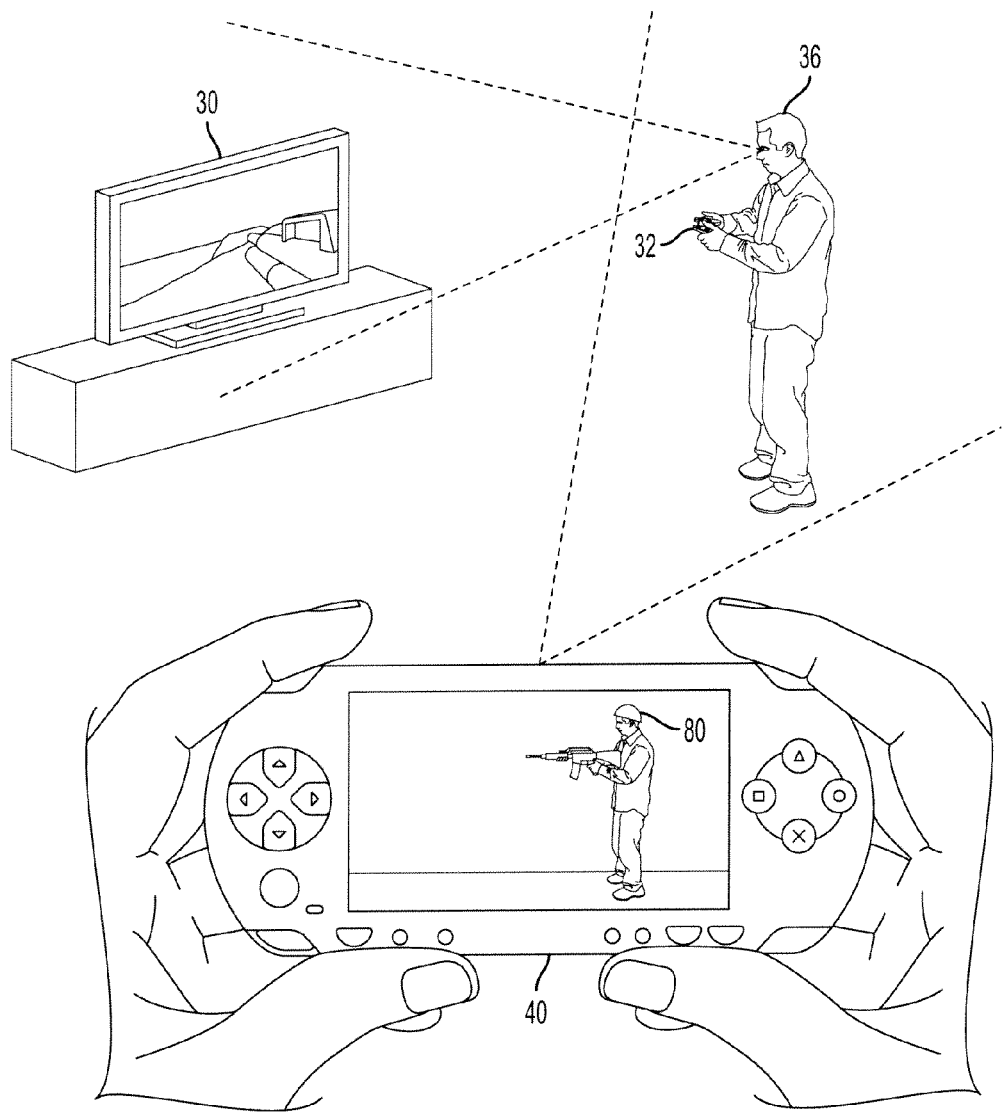
FIG. 4B illustrates the interactive environment of FIG. 4A from the perspective of the spectator, in accordance with an embodiment of the invention.

With reference to FIG. 4A, a top view of an interactive environment including a user 36 and a spectator 48 interacting with an interactive application is shown, in accordance with an embodiment of the invention. The user 36 operates a controller 32 to provide input to the interactive application. As shown, the spectator 48 operates a handheld device 40, and orients it towards the user 36. The position and orientation of the handheld device 40 are tracked so as to enable determination of the direction towards which the handheld device 40 is directed. Additionally, the position of the user 36 may be identified by tracking the position of the controller 32. FIG. 4B illustrates the interactive environment of FIG. 4A from the perspective of the spectator 48. As shown, as the spectator 48 orients the handheld device 40 towards the user 36 (typically, directing a backside of the handheld device 40 so that it faces the user 36), the spectator views a character 80 of the interactive application in place of the user 36. The character may be set in a virtual space of the interactive application.

In one embodiment, the location of the user 36 is determined relative to the handheld device 40 by capturing an image stream from a rear-facing camera of the handheld device 40. The captured image stream is analyzed to determine the presence of the user 36, and the user 36 is replaced with a character of the interactive application. In one embodiment, selected portions of the user 36 may be augmented with virtual features, so as to form an augmented reality image stream which is displayed on the handheld device. For example, the user 36 could be shown holding a weapon, wearing different clothes, or being outfitted with various other items. In one embodiment, the user 36 might be shown set in a virtual space of the interactive application. In this manner, the spectator 48 is able to view the user 36 as if he or she is directly in the virtual space of the interactive application.

Figure 5:
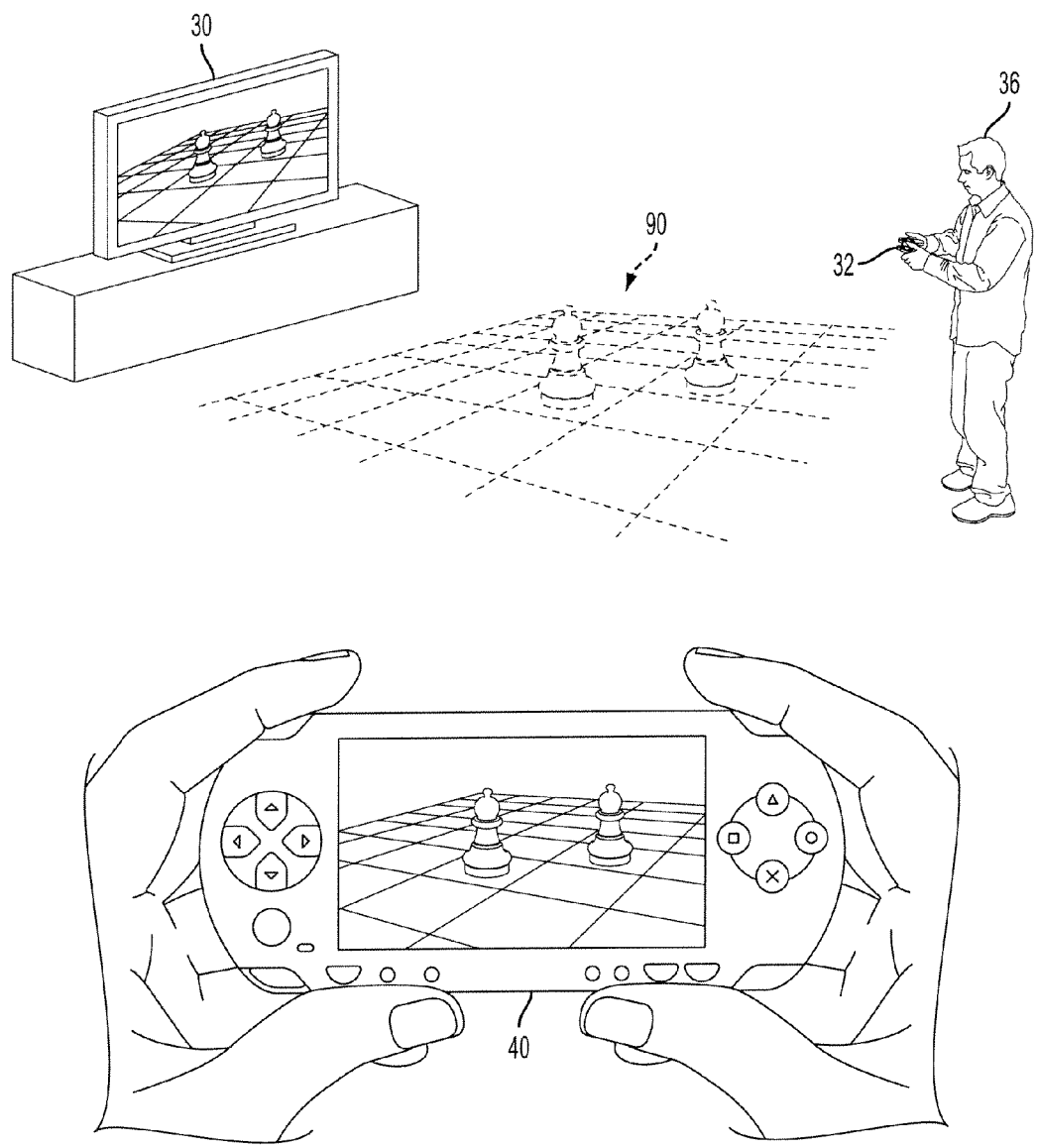
FIG. 5 illustrates an interactive environment including a user interacting with an interactive application, shown from the perspective of a spectator operating a handheld device, in accordance with an embodiment of the invention.

With reference to FIG. 5, an interactive environment including a user 36 interacting with an interactive application is shown from the perspective of a spectator operating a handheld device 40, in accordance with an embodiment of the invention. The user 36 operates a controller 32 to provide input to the interactive application. As shown, the user 36 is playing a chess game, which the user 36 views on the display 30. Simultaneously, the spectator is able to view a virtual space 90 in which the chess game takes place. As the spectator maneuvers the handheld device 40 within the interactive environment, the virtual space 90 is shown from different perspectives on the handheld device 40 based on the location and orientation of the handheld device 40. In this manner, the spectator is able to view the virtual space 90 from different vantage points as if it existed in the interactive environment. The handheld device 40 thus functions as a viewer or virtual window enabling the spectator to view the virtual space of the interactive application.

With reference to FIG. 6, an interactive environment is shown from the perspective of a spectator, in accordance with an embodiment of the invention. As shown, a user 36 operates motion controllers 100a and 100b while viewing an interactive application rendered on a display 30. In the present embodiment, the interactive application is a boxing game, wherein the movements of the motion controllers 100a and 100b as they are maneuvered by the user 36 are detected and processed to enable the interactive application to render similar movements of fists shown on the display 30. In this manner, the user 36 is provided with an experience of fighting in a boxing match, wherein as the user 36 throws punches, the fists shown on the display move in a similar fashion. Thus, the user 36 controls the fists and their movements by moving the motion controllers 100a and 100b. In one embodiment, the interactive system includes an image capture device 106, which captures images of the motion controllers 100a and 100b. These images are analyzed to determine the motion of the controllers 100a and 100b. Furthermore, the captured images may be analyzed to determine the position and orientation of the handheld device 40. In one embodiment, the image capture device 106 includes a depth camera for capturing depth information of the interactive environment. The captured depth information can be processed to aid in determining the location and movements of the user 36 as well as the spectator and the handheld device 40. Examples of motion controllers include the Playstation Move® controller which is manufactured by Sony Computer Entertainment Inc.

In one embodiment, the user 36 fights against a virtual opponent 102. The spectator operating a handheld device 40 directs the handheld device 40 towards the user 36 (typically, so that the back side of the handheld device 40 faces the user 36). The handheld device 40 displays video of the user 36 fighting with the virtual opponent 102 in real-time. In one embodiment, as the spectator directs the handheld device 40 towards the user 36, a camera included in the handheld device 40 captures video including the user 36 and the motion controllers 100a and 100b. The captured video may be analyzed to determine the location of the user as well as the movements of the motion controllers 100a and 100b. The handheld device 40 may also receive information about the location of the user and movements of the motion controllers 100a and 100b from the interactive application. In one embodiment, the user 36 is shown in the video displayed on the handheld device 40 but with boxing gloves on the user's 36 hands in place of the motion controllers 100a and 100b. In another embodiment, instead of displaying the user 36, a character of the boxing game that is being controlled by the user 36 is displayed on the handheld device 40.

Additionally, as the spectator maneuvers the handheld device 40 to different positions and orientations relative to the user 36, the video shown on the handheld device 40 will reflect these changes. Thus, if the spectator moves to a location approximately behind the user 36 and directs the handheld device 40 towards the user 36, then the spectator will be able to view on the handheld device 40 the back side of the user 36 or a character controlled by the user 36, and may see the front side of the virtual opponent 102 if not occluded by the user 36 or some other object. Similarly, if the spectator moves to a location approximately in front of the user 36 and directs the handheld device towards the user 36, then the spectator will be able to view the front side of the user 36 if not occluded by, e.g. the virtual opponent 102 (the back side of which may be visible in the view). The spectator may maneuver the handheld device 40 to be closer to the user 36 and so zoom in on the user 36, or maneuver the handheld device 40 to be further away, and so be able to enjoy a more expansive view of the boxing match between the user 36 and the virtual opponent 102. As the spectator moves the handheld device 40 to different positions and orientations, the handheld device 40 displays video from a virtual viewpoint within a virtual space of the interactive application whose position and orientation is determined based on the position and orientation of the handheld device 40. Thus, as the user 36 interacts with the boxing game, the spectator is able to interact as a virtual cameraman, controlling the viewpoint from which video of the interactive game is displayed on the handheld device 40 by maneuvering the handheld device 40.

In another embodiment, the camera 106 may be a depth camera capable of capturing depth information of objects in the interactive environment. In one embodiment, the user 36 does not require motion controllers, but is able to provide interactive input to the interactive application through movements which are detected by the camera 106. The camera 106 may be configured to capture both images of the interactive environment as well as depth information, which are processed to determine the position, orientation, and movements of the user 36. These are then utilized by the interactive application as input.

Figure 7:
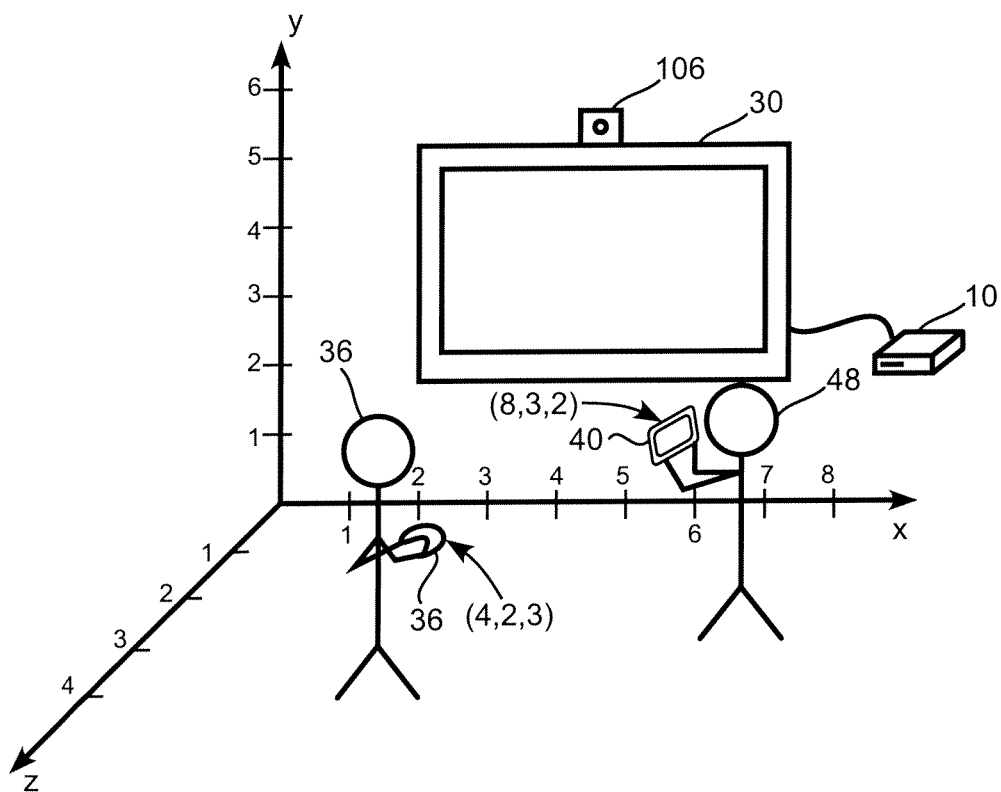
FIG. 7 illustrates an interactive environment, including a console device which executes an interactive application that is rendered on a main display, in accordance with an embodiment of the invention.

With reference to FIG. 7, an interactive environment is shown, including a console device 10 which executes an interactive application that is rendered on a main display 30. A user 36 operates a controller 32 so as to provide interactive input to the interactive application. An image capture device 106 captures images of the interactive environment. Simultaneously, a spectator 48 operates and views a handheld device 40, the handheld device 40 rendering an ancillary video stream which is related to that being rendered on the main display 30. As shown, the position, orientation, and movements of the controller 32 and the handheld device 40 may be tracked in a three-dimensional (x, y, z) coordinate space. In the illustrated embodiment, the controller 32 has coordinates (4, 2, 3) whereas the handheld device has coordinates (8, 3, 2). By tracking the positions and movements of the controller 32 and the handheld device 40, it is possible to determine the relative positioning of the controller 32 and the handheld device 40. This information may be utilized to affect the ancillary video stream rendered on the handheld device 40, for example, determining the location of a virtual viewpoint within a virtual space of the interactive application based on the relative positions of the controller 32 and handheld device 40 in the real-world interactive environment.

In one embodiment, the interactive application may define a correlation between the virtual space and the aforementioned three-dimensional coordinate space in the real-world interactive environment, such that the coordinate system of the real-world interactive environment is mapped to a coordinate system of the virtual space. In various embodiments, the nature of this mapping may vary. For example, in one embodiment, the mapping may be scaled one-to-one, such that distances in the real-world correspond to equivalent distances in the virtual world. In other embodiments, the mapping may be scaled by a certain factor, such that distances in the virtual-world are greater than or less than corresponding distances in the real-world.

Figure 8A:
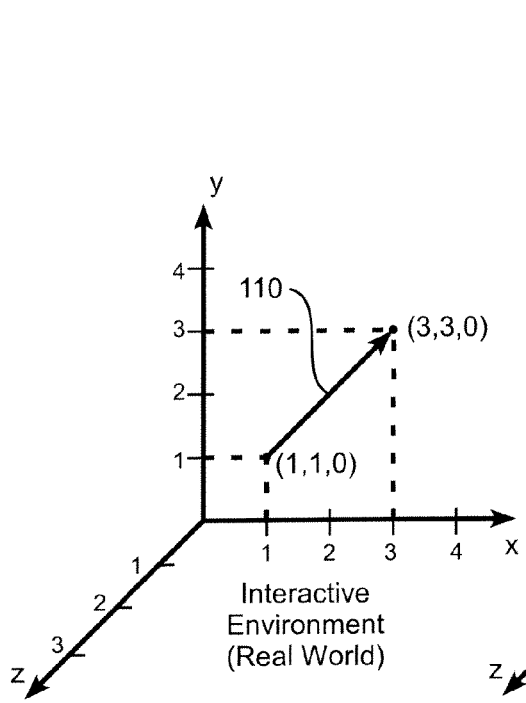
FIG. 8A illustrates a coordinate space of a real-world interactive environment, in accordance with an embodiment of the invention.
Figure 8B:
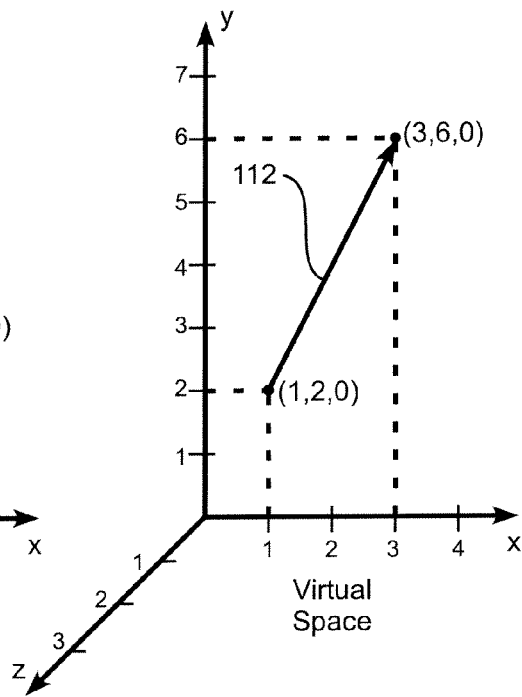
FIG. 8B illustrates a coordinate space of a virtual space corresponding to the coordinate space of the real-world interactive environment of FIG. 8A.

Additionally, the scale of the mapping for each of the corresponding axes of the virtual and real-world coordinate systems may vary. For example, in one embodiment, the y-axis in the real-world may be mapped so as to have an increased scale in the virtual world (e.g. multiplied by a factor greater than one). Whereas, the x-axis and z-axis in the real-world may be mapped to the corresponding axes in the virtual space in an exact correspondence. One example of such a configured is illustrated with reference to FIGS. 8A and 8B. FIG. 8A illustrates a coordinate space of a real-world interactive environment. A vector movement 110 is shown from coordinates (1, 1, 0) to (3, 3, 0). FIG. 8B illustrates a corresponding coordinate space of a virtual space. The vector 112 from coordinates (1, 2, 0) to (3, 6, 0) corresponds to the vector movement 110. As can be seen, the vector movement 110 is amplified in the vertical y-axis only, whereas it is not amplified in the x and z-axes. Thus, by selectively amplifying y-axis movements, when the spectator 48 moves the handheld device 40 vertically, the movement of the virtual viewpoint in the virtual space is magnified, which may enable the spectator 48 to more easily view and capture video from high and low positions, whereas movement of the handheld device along horizontal directions (x-axis and z-axis) is not magnified. It will be appreciated by those skilled in the art that in other embodiments of the invention, the scale of the mapping for any given direction or axis may vary from other directions or axes.

And furthermore, the scale of the mapping may vary along any given axis or direction, or with reference to a particular location, such as the location of the user. For example, in one embodiment, the mapping near the user is scaled in a more exact correspondence, whereas mapping further away from the user is scaled so that movements of the handheld device away from the user are magnified in the virtual space. Thus, when the spectator operates the handheld device near the user, movements in the interactive environment correspond to similar movements in the virtual space. Whereas, as the spectator moves the handheld device away from the user, the corresponding movement in the virtual space (e.g. movement away from a character controlled by the user) may be come progressively magnified. This enables the spectator to control the location of the virtual viewpoint in a natural manner when close the user, yet also have the ability to move the virtual viewpoint further away in the virtual space than would be possible if the mapping maintained the same scale of correspondence throughout.

Figure 9A:
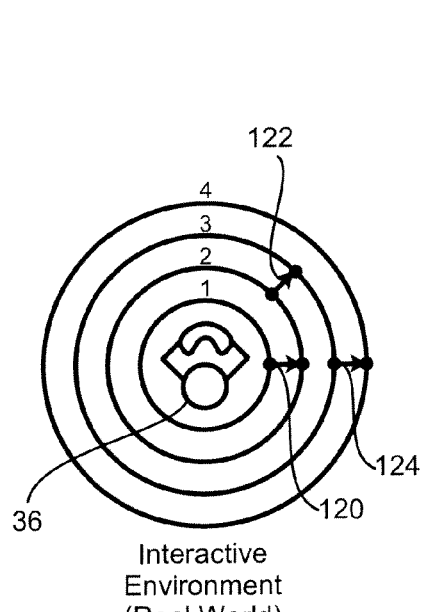
FIG. 9A illustrates a user whose location in an interactive environment defines the origin of a spherical or cylindrical coordinate system, in accordance with an embodiment of the invention.
Figure 9B:
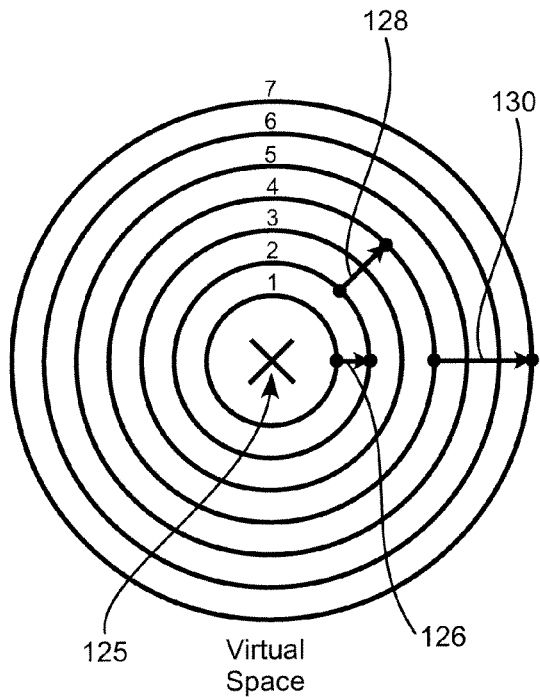
FIG. 9B illustrates a virtual space to which the interactive environment of FIG. 9A has been mapped.

One example of such an embodiment is illustrated with reference to FIGS. 9A and 9B. FIG. 9A illustrates a user 36 whose location in an interactive environment defines the origin of a spherical or cylindrical coordinate system. A vector 120 is shown indicating a movement from a distance of 1 to 2 away from the user 36. Similarly, a vector 122 indicates a movement from a distance of 2 to 3; and a vector 124 indicates a movement from 3 to 4. FIG. 9B illustrates a virtual space to which the interactive environment has been mapped. The location 125 in the virtual space corresponds to the location of the user 36 in the interactive environment. For example, in some embodiments, the location 125 may represent the location of a character, vehicle or some other object controlled by the user 36. The vector 126 corresponds to the real-world vector 120. As shown, vector 126 has an exact correspondence to vector 120, indicating a change in distance from 1 to 2. The vector 128 corresponds to the vector 122. However, as shown, the mapping of the coordinate space of the interactive environment to that of the virtual space is such that the vector 122 is magnified in scale by a factor of two. Hence the vector 122 indicating a change in distance from 2 to 3 in the real-world interactive environment is mapped to the vector 128 indicating a change in distance from 2 to 4 in the virtual space. The vector 130 corresponds to the vector 124. As shown, while the vector 124 indicates a change in distance from 3 to 4 in the interactive environment, the corresponding vector 130 indicates a change in distance from 4 to 7, thereby tripling the change in distance in the virtual space.

The foregoing illustrated example represents merely one embodiment wherein mapping from the interactive environment to the virtual space is configured to have increasing amplification with increased distance from a reference location in the interactive environment. In other embodiments, the changes in amplification with increasing distance may vary according to any schema, such as linearly, logarithmically, or according to preset zones which may be constant within each zone or vary as well.

In some embodiments, the nature of the mapping may change in accordance with changes in the state of the interactive application. By varying the mapping and correspondence of the real-world to the virtual world, it is possible to tailor the use of information regarding real-world movements of the handheld device 40 and controller 32, so as to enable improved interactive functionality with respect to the interactive application.

With reference to FIG. 10A, an overhead view of an interactive environment is shown, in accordance with an embodiment of the invention. A user 36 operates a controller 32 to interact with an interactive application which is rendered on a display 30. Simultaneously, a spectator 48 operates a handheld device 40 in the interactive environment, the handheld device 40 displaying video of a virtual space of the interactive application from a virtual viewpoint in the virtual space which is based on the location of the handheld device 40 relative to the location of the user 36. In an interactive sequence, the spectator 48 moves from a position 140 next to the user 36, to a position 142 further to the side of the user 36, to a position 144 in front of the user 36. With reference to FIG. 10B, scenes 146, 148, and 150 illustrate video which is displayed on the handheld device 40 when the spectator is located at positions 140, 142, and 144 respectively.

In the illustrated embodiment, the user 36 is playing an interactive game in which the user 36 drives a vehicle in the virtual space. The position of the user 36 is mapped to the position of a virtual driver (controlled by the user 36) of the vehicle in the virtual space. Thus, when the spectator 48 is located at position 140 adjacent to the user 36, the virtual viewpoint in the virtual space is located adjacent to the driver of the vehicle. As shown by the scene 146, the video shown on the handheld device 40 illustrates the interior of the vehicle from the perspective of a viewpoint adjacent to the virtual driver of the vehicle. When the spectator 48 moves to the position 142 further to the side of the user 36, the virtual viewpoint is moved in a corresponding fashion in the virtual space. As shown by the corresponding scene 148, the virtual viewpoint has moved to a location outside of the vehicle, as the scene 148 illustrates the side of the vehicle. Similarly, when the spectator 48 moves to the position 144 in front of the user 36, the virtual viewpoint is moved in a corresponding manner within the virtual space, to a position in front of the vehicle. As shown by the scene 150, when located at position 144, the user 48 views the front of the vehicle on the handheld device 40.

For ease of description, some of the aforementioned embodiments of the invention have been generally described with reference to one player operating a controller (or providing input through a motion detection system) and/or one user operating a handheld device. It will be understood by those skilled in the art that in other embodiments of the invention, there may be multiple users operating controllers (or providing input through motion detection) and/or multiple users operating handheld devices.

Figure 11:
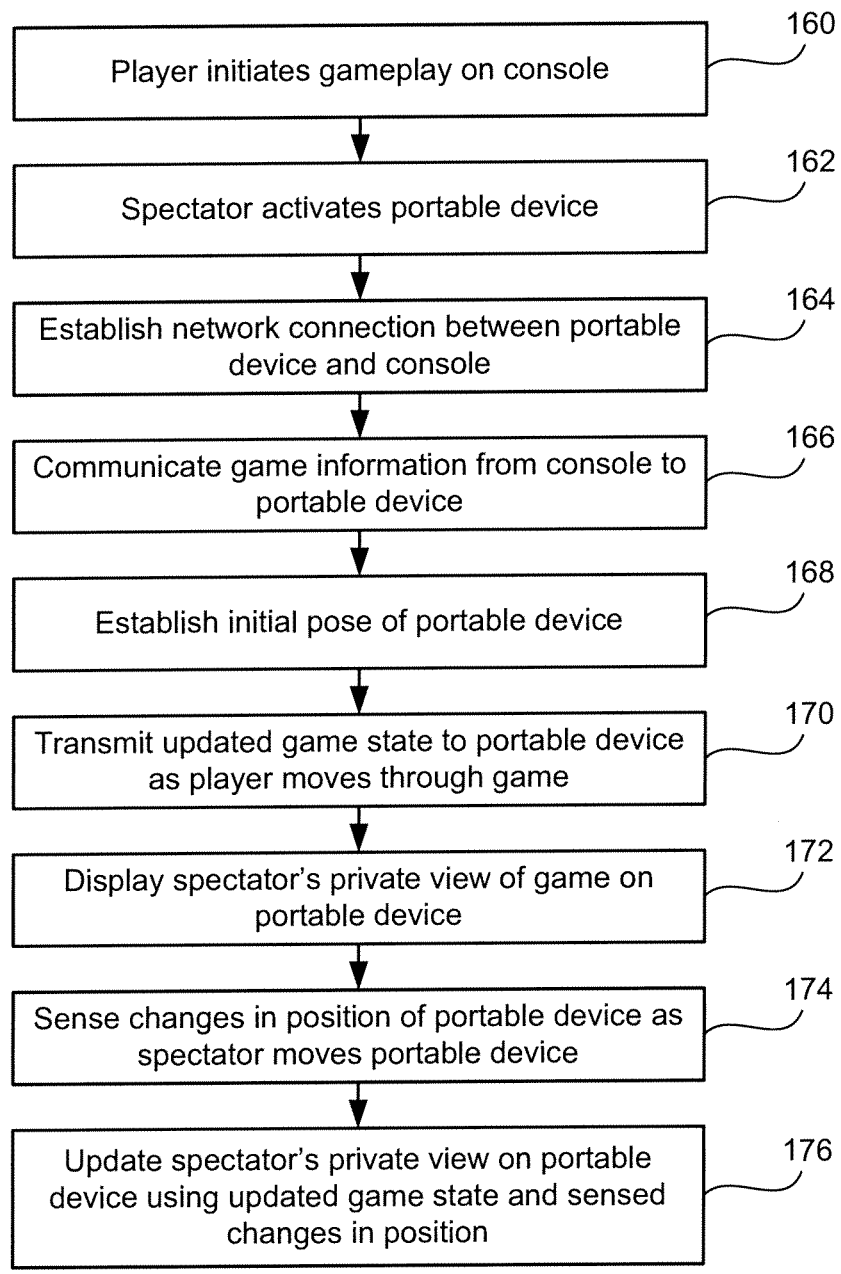
FIG. 11 illustrates a method for enabling a portable device operated by a spectator to display video of an interactive game, in accordance with an embodiment of the invention.

With reference to FIG. 11, a method for enabling a portable device operated by a spectator to display video of an interactive game is shown, in accordance with an embodiment of the invention. At method operation 160, a player initiates gameplay on a console device. At method operation 162, a spectator activates a portable device. At method operation 164, a network connection between the portable device and the console is established. At method operation 166, information about the game is communicated from the console to the portable device. At method operation 168, an initial pose of the portable device is established. In various embodiments, the initial pose may be determined through various mechanisms, such as defining a current state of internal position tracking sensors as the initial pose, or by searching for a marker on the TV screen and defining the relationship to the TV as the initial pose. At method operation 170, an updated game state is transmitted to the portable device as the player moves through the game. At method operation 172, the portable device displays the spectator's private view of the game. At method operation 174, as the spectator moves the portable device, the device senses changes in position relative to the initial pose. In various embodiments, this may be accomplished by, for example, using internal motion sensors, a directional pad, or by tracking the marker on the TV screen and determining position based on its new orientation. At method operation 176, the portable device uses this new information to update the spectator's private view of the display.

In various embodiments of the invention, various other method operations may be included in the method. For example, in one embodiment, the spectator may press a record button on the portable device to initiate recording of the spectator's private view of the game on the portable device. In another embodiment, the portable device is configured to allow the spectator to pan, zoom, or crop the live video or the prerecorded video. In another embodiment, the portable device provides the spectator with other video editing tools to manipulate the live or prerecorded video, such as chroma keying, color change tools, cut and paste, etc. In yet another embodiment, the spectator can upload the recorded video or images to an Internet site to share with others.

In various embodiments of the invention, different configurations may be utilized to enable the portable device to display video of the game. For example, in one embodiment, the console renders all images from the portable device's perspective and streams these rendered images to the portable device. In this case, the portable device communicates its pose to the console, but is not required to execute or maintain any software or information specifically related to the actual execution of the game itself other than that needed to render the images which it receives from the console. However, in another embodiment, the portable device contains some or all of the levels and models of the game being played. In this embodiment, the console only needs to send the coordinates of the dynamic objects to the portable device so that the portable device can update its scene graph and render the appropriate images on its display. In yet another embodiment, the portable device could run a scaled down version of the interactive application, with the stored levels and models having reduced complexity.

Furthermore, in various embodiments of the invention, the interactive functionality of the portable device thus described may be designed with or without allowing the spectator to affect the outcome of the game. For example, in one embodiment, the spectator's personal view would be limited to a reasonably small deviation from the player's game view. This allows the spectator some level of control without revealing much additional information that the spectator could share with the player. Conversely, in another embodiment, the spectator might be allowed full degrees of motion with the portable device. In this case, the spectator may actually impact the outcome of the game because the spectator can watch action that is occurring outside the view of the player and communicate this to the player (e.g. calling out a warning if an enemy approaches from behind that the player is not aware of).

Figure 12:
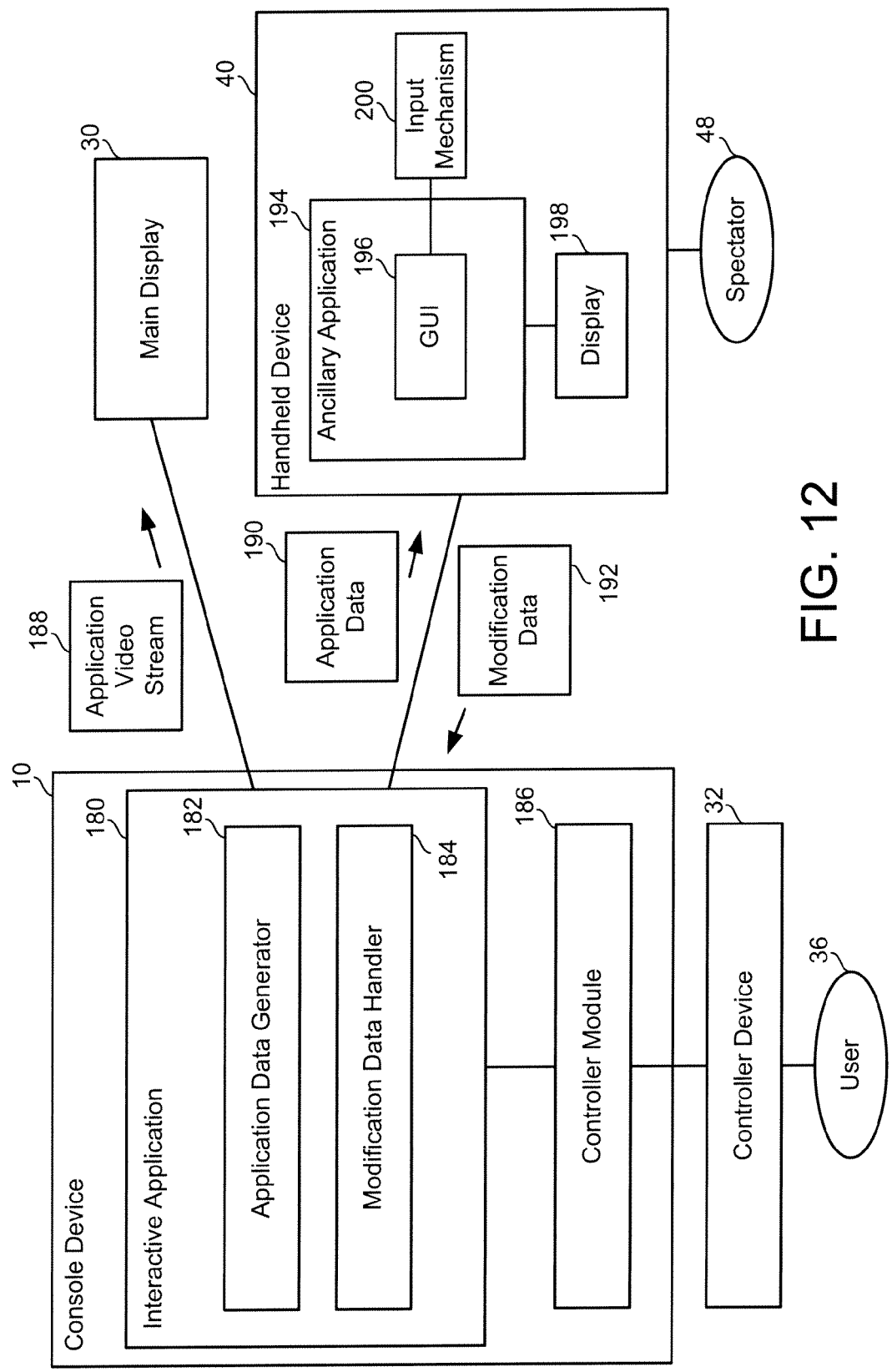
FIG. 12 illustrates a system for enabling a spectator to utilize a handheld device to affect the state of an interactive application, in accordance with an embodiment of the invention.

With reference to FIG. 12, a system for enabling a spectator to utilize a handheld device to affect the state of an interactive application is shown, in accordance with an embodiment of the invention. A console device 10 executes an interactive application 180. An application video stream 188 is generated based on the state of the interactive application 180 and sent to a main display 30 for rendering. A user 36 operates a controller device 32 to provide input to the interactive application 180 via a controller module 186 which handles the raw input from the controller device 32. An application data generator 182 generates application data 190, which is sent to an ancillary application 194 executing on the handheld device 40. The handheld device 40 includes an input mechanism 200 for receiving input from the spectator 48 and a display 198. The ancillary application 194 includes a graphical user interface (GUI) 196 which is displayed on the display 198. The GUI may provide a series of menus and prompts which allow the spectator to affect the state of the interactive application, such as aural and visual aspects of the interactive application. The spectator 48 provides input utilizing the input mechanism 200. Based on the spectator's input, the ancillary application generates modification data 192 which is sent to a modification data handler 184 of the interactive application 180 on the console device 10. Based on the modification data 192, the state of the interactive application 180 is altered, which affects the application video stream 188 which is generated.

Figure 13:
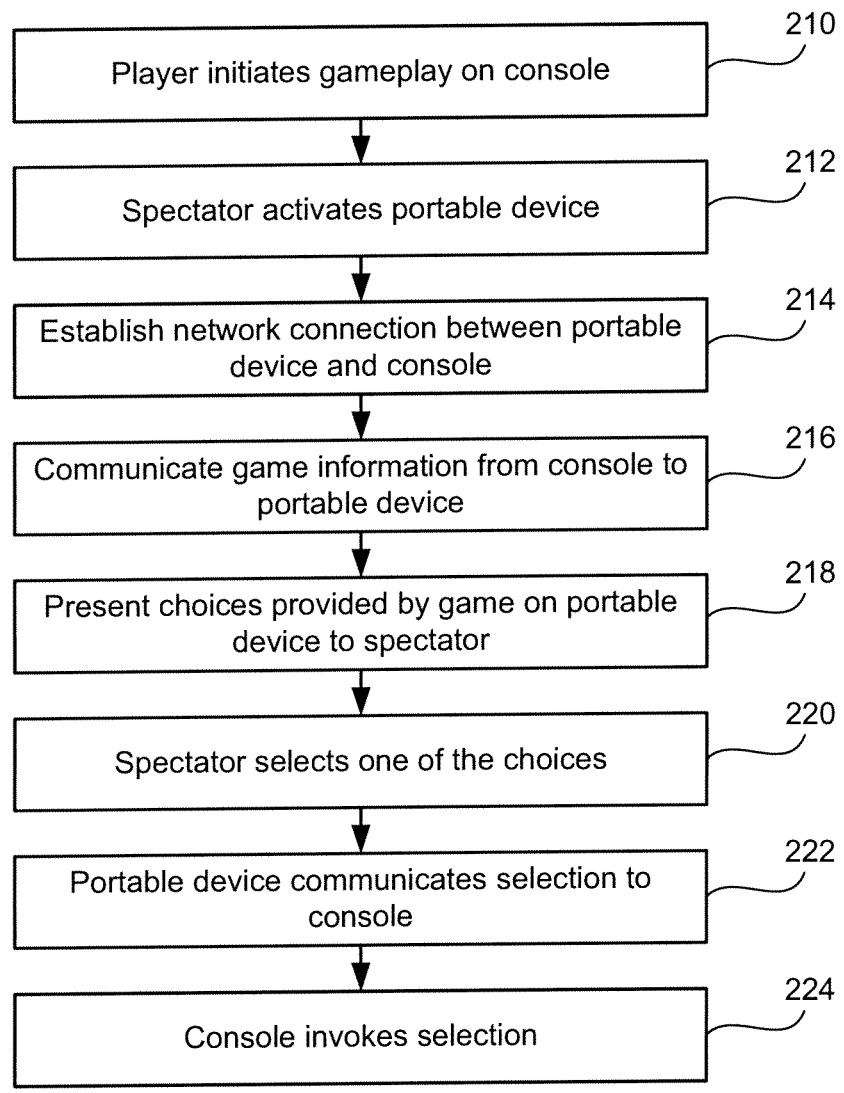
FIG. 13 illustrates a method for enabling a spectator to affect a game utilizing a portable device, in accordance with an embodiment of the invention.

With reference to FIG. 13, a method for enabling a spectator to affect a game utilizing a portable device is shown, in accordance with an embodiment of the invention. At method operation 210, a player initiates gameplay on a console device. At method operation 212, a spectator activates a portable device. At method operation 214, the portable device establishes a network connection with the console device. At method operation 216, information about the game is communicated from the console device to the portable device. In various embodiments, the information may include, by way of example only, characters in play, available costumes for a character, a list of songs available to play as a sound track, or other parameters of the game which the spectator may be able to adjust. At method operation 218, the portable device presents the choices provided by the game to the spectator. At method operation 220, the spectator selects one of the choices. For example, the spectator might pick a song to be played or select a costume to be worn by a character. At method operation 222, the portable device communicates the selection to the console via the network connection. At method operation 224, the console invokes the selection. For example, the console may play the selected song or change the costume of a character to the selected costume.

In various embodiments, the parameters which the spectator is allowed to adjust may or may not affect the outcome of the game to varying degrees. For example, in one embodiment, the spectator is able to modify the costumes or sound effects of the game, such that the outcome of the game is unlikely to be affected. In another embodiment, the spectator might control more intrusive elements of the game, such as the flow of time (e.g. speeding it up or slowing it down), or changing the world's gravity to match that of a larger or smaller planet, or perhaps set no gravity at all. Such changes would likely have a significant impact on the outcome of the game.

Figure 14:
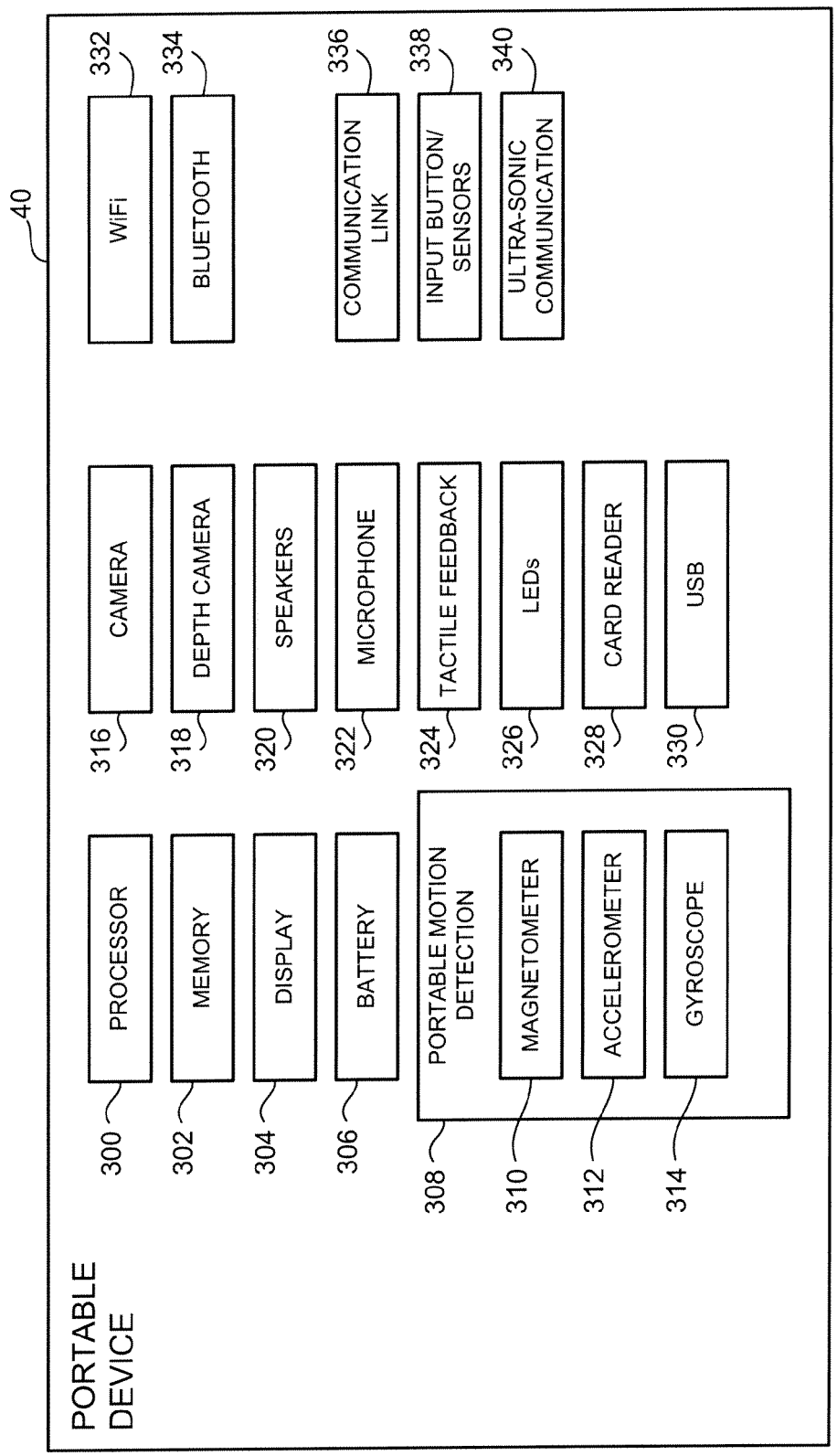
FIG. 14 illustrates a diagram showing components of a portable device, in accordance with an embodiment of the invention.

With reference to FIG. 14, a diagram illustrating components of a portable device 40 is shown, in accordance with an embodiment of the invention. The portable device 40 includes a processor 300 for executing program instructions. A memory 302 is provided for storage purposes, and may include both volatile and non-volatile memory. A display 304 is included which provides a visual interface that a user may view. A battery 306 is provided as a power source for the portable device 40. A motion detection module 308 may include any of various kinds of motion sensitive hardware, such as a magnetometer 310, an accelerometer 312, and a gyroscope 314.

An accelerometer is a device for measuring acceleration and gravity induced reaction forces. Single and multiple axis models are available to detect magnitude and direction of the acceleration in different directions. The accelerometer is used to sense inclination, vibration, and shock. In one embodiment, three accelerometers 312 are used to provide the direction of gravity, which gives an absolute reference for two angles (world-space pitch and world-space roll).

A magnetometer measures the strength and direction of the magnetic field in the vicinity of the controller. In one embodiment, three magnetometers 310 are used within the controller, ensuring an absolute reference for the world-space yaw angle. In one embodiment, the magnetometer is designed to span the earth magnetic field, which is ±80 microtesla. Magnetometers are affected by metal, and provide a yaw measurement that is monotonic with actual yaw. The magnetic field may be warped due to metal in the environment, which causes a warp in the yaw measurement. If necessary, this warp can be calibrated using information from other sensors such as the gyroscope or the camera. In one embodiment, accelerometer 312 is used together with magnetometer 310 to obtain the inclination and azimuth of the portable device 40.

A gyroscope is a device for measuring or maintaining orientation, based on the principles of angular momentum. In one embodiment, three gyroscopes 314 provide information about movement across the respective axis (x, y and z) based on inertial sensing. The gyroscopes help in detecting fast rotations. However, the gyroscopes can drift overtime without the existence of an absolute reference. This requires resetting the gyroscopes periodically, which can be done using other available information, such as positional/orientation determination based on visual tracking of an object, accelerometer, magnetometer, etc.

A camera 316 is provided for capturing images and image streams of a real environment. More than one camera may be included in the portable device 40, including a camera that is rear-facing (directed away from a user when the user is viewing the display of the portable device), and a camera that is front-facing (directed towards the user when the user is viewing the display of the portable device). Additionally, a depth camera 318 may be included in the portable device for sensing depth information of objects in a real environment.

The portable device 40 includes speakers 320 for providing audio output. Also, a microphone 322 may be included for capturing audio from the real environment, including sounds from the ambient environment, speech made by the user, etc. The portable device 40 includes tactile feedback module 324 for providing tactile feedback to the user. In one embodiment, the tactile feedback module 324 is capable of causing movement and/or vibration of the portable device 40 so as to provide tactile feedback to the user.

LEDs 326 are provided as visual indicators of statuses of the portable device 40. For example, an LED may indicate battery level, power on, etc. A card reader 328 is provided to enable the portable device 40 to read and write information to and from a memory card. A USB interface 330 is included as one example of an interface for enabling connection of peripheral devices, or connection to other devices, such as other portable devices, computers, etc. In various embodiments of the portable device 40, any of various kinds of interfaces may be included to enable greater connectivity of the portable device 40.

A WiFi module 332 is included for enabling connection to the Internet via wireless networking technologies. Also, the portable device 40 includes a Bluetooth module 334 for enabling wireless connection to other devices. A communications link 336 may also be included for connection to other devices. In one embodiment, the communications link 336 utilizes infrared transmission for wireless communication. In other embodiments, the communications link 336 may utilize any of various wireless or wired transmission protocols for communication with other devices.

Input buttons/sensors 338 are included to provide an input interface for the user. Any of various kinds of input interfaces may be included, such as buttons, touchpad, joystick, trackball, etc. Additionally, bio-sensors may be included to enable detection of physiological data from a user. In one embodiment, the bio-sensors include one or more dry electrodes for detecting bio-electric signals of the user through the user's skin.

An ultra-sonic communication module 340 may be included in portable device 40 for facilitating communication with other devices via ultra-sonic technologies.

The foregoing components of portable device 40 have been described as merely exemplary components that may be included in portable device 40. In various embodiments of the invention, the portable device 40 may or may not include some of the various aforementioned components. Embodiments of the portable device 40 may additionally include other components not presently described, but known in the art, for purposes of facilitating aspects of the present invention as herein described.

Figure 15:
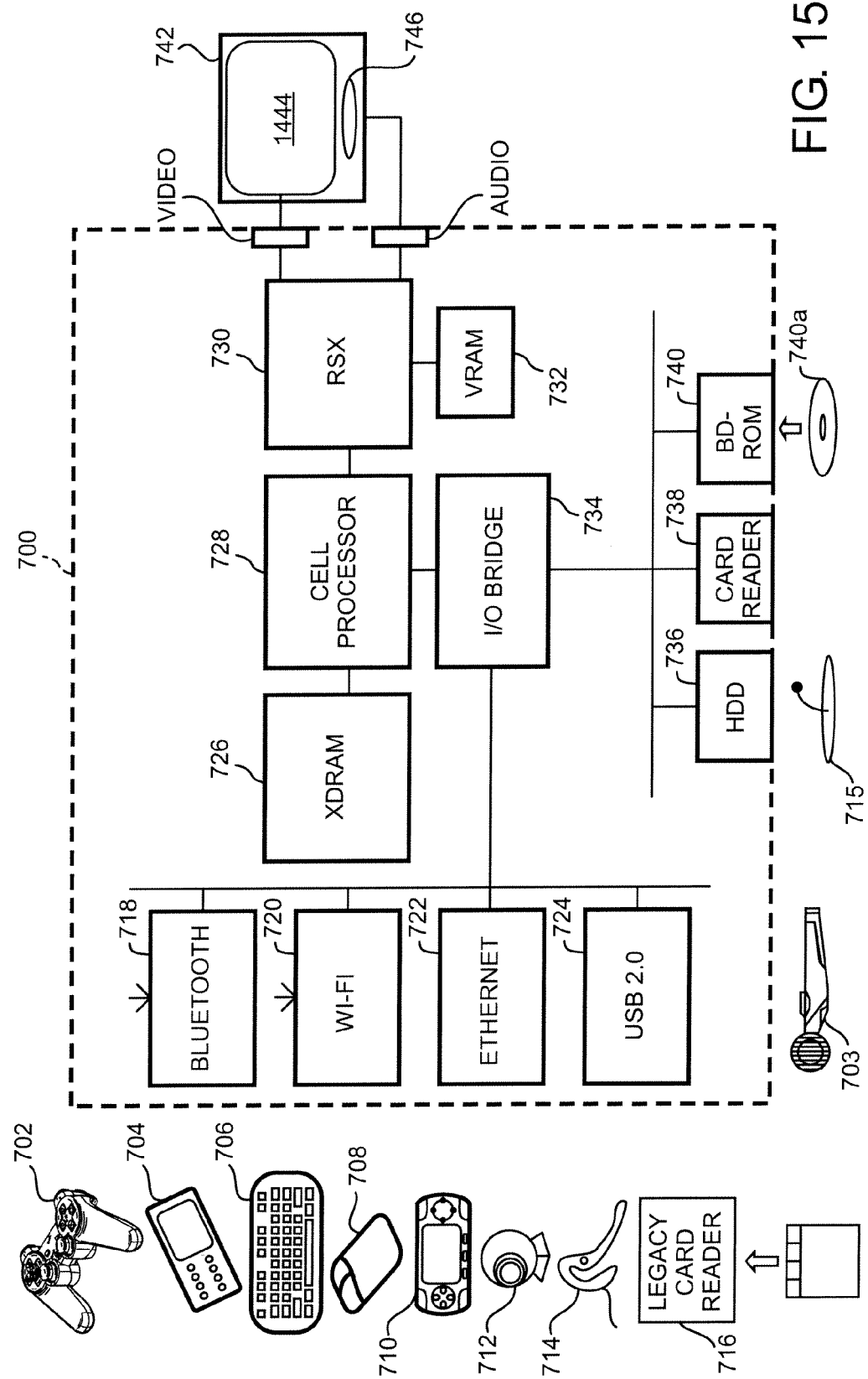
FIG. 15 schematically illustrates the overall system architecture of the Sony® Playstation 3® entertainment device, a console that may be compatible for interfacing a control device and a handheld device with a computer program executing at a base computing device in accordance with embodiments of the present invention.

FIG. 15 illustrates hardware and user interfaces that may be used to execute and render an interactive application, in accordance with one embodiment of the present invention. More specifically, FIG. 15 schematically illustrates the overall system architecture of the Sony® Playstation 3® entertainment device, a console that may be compatible for interfacing a control device and a handheld device with a computer program executing at a base computing device in accordance with embodiments of the present invention. A system unit 700 is provided, with various peripheral devices connectable to the system unit 700. The system unit 700 comprises: a Cell processor 728; a Rambus® dynamic random access memory (XDRAM) unit 726; a Reality Synthesizer graphics unit 730 with a dedicated video random access memory (VRAM) unit 732; and an I/O bridge 734. The system unit 700 also comprises a Blu Ray® Disk BD-ROM® optical disk reader 740 for reading from a disk 740a and a removable slot-in hard disk drive (HDD) 736, accessible through the I/O bridge 734. Optionally the system unit 700 also comprises a memory card reader 738 for reading compact flash memory cards, Memory Stick® memory cards and the like, which is similarly accessible through the I/O bridge 734.

The I/O bridge 734 also connects to six Universal Serial Bus (USB) 2.0 ports 724; a gigabit Ethernet port 722; an IEEE 802.11b/g wireless network (Wi-Fi) port 720; and a Bluetooth® wireless link port 718 capable of supporting up to seven Bluetooth connections.

In operation, the I/O bridge 734 handles all wireless, USB and Ethernet data, including data from one or more game controllers 702-703. For example when a user is playing a game, the I/O bridge 734 receives data from the game controller 702-703 via a Bluetooth link and directs it to the Cell processor 728, which updates the current state of the game accordingly.

The wireless, USB and Ethernet ports also provide connectivity for other peripheral devices in addition to game controllers 702-703, such as: a remote control 704; a keyboard 706; a mouse 708; a portable entertainment device 710 such as a Sony Playstation Portable® entertainment device; a video camera such as an EyeToy® video camera 712; a microphone headset 714; and a microphone 715. Such peripheral devices may therefore in principle be connected to the system unit 700 wirelessly; for example the portable entertainment device 710 may communicate via a Wi-Fi ad-hoc connection, whilst the microphone headset 714 may communicate via a Bluetooth link.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 716 may be connected to the system unit via a USB port 724, enabling the reading of memory cards 748 of the kind used by the Playstation® or Playstation 2® devices.

The game controllers 702-703 are operable to communicate wirelessly with the system unit 700 via the Bluetooth link, or to be connected to a USB port, thereby also providing power by which to charge the battery of the game controllers 702-703. Game controllers 702-703 can also include memory, a processor, a memory card reader, permanent memory such as flash memory, light emitters such as an illuminated spherical section, LEDs, or infrared lights, microphone and speaker for ultrasound communications, an acoustic chamber, a digital camera, an internal clock, a recognizable shape such as the spherical section facing the game console, and wireless communications using protocols such as Bluetooth®, WiFi™, etc.

Game controller 702 is a controller designed to be used with two hands, and game controller 703 is a single-hand controller with an attachment. In addition to one or more analog joysticks and conventional control buttons, the game controller is susceptible to three-dimensional location determination. Consequently gestures and movements by the user of the game controller may be translated as inputs to a game in addition to or instead of conventional button or joystick commands. Optionally, other wirelessly enabled peripheral devices such as the Playstation™ Portable device may be used as a controller. In the case of the Playstation™ Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 704 is also operable to communicate wirelessly with the system unit 700 via a Bluetooth link. The remote control 704 comprises controls suitable for the operation of the Blu Ray™ Disk BD-ROM reader 540 and for the navigation of disk content.

The Blu Ray™ Disk BD-ROM reader 740 is operable to read CD-ROMs compatible with the Playstation and PlayStation 2 devices, in addition to conventional pre-recorded and recordable CDs, and so-called Super Audio CDs. The reader 740 is also operable to read DVD-ROMs compatible with the Playstation 2 and PlayStation 3 devices, in addition to conventional pre-recorded and recordable DVDs. The reader 740 is further operable to read BD-ROMs compatible with the Playstation 3 device, as well as conventional pre-recorded and recordable Blu-Ray Disks.

The system unit 700 is operable to supply audio and video, either generated or decoded by the Playstation 3 device via the Reality Synthesizer graphics unit 730, through audio and video connectors to a display and sound output device 742 such as a monitor or television set having a display 744 and one or more loudspeakers 746. The audio connectors 750 may include conventional analogue and digital outputs whilst the video connectors 752 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 728. The Playstation 3 device's operating system supports Dolby® 5.1 surround sound, Dolby® Theatre Surround (DTS), and the decoding of 7.1 surround sound from Blu-Ray® disks.

In the present embodiment, the video camera 712 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 700. The camera LED indicator is arranged to illuminate in response to appropriate control data from the system unit 700, for example to signify adverse lighting conditions. Embodiments of the video camera 712 may variously connect to the system unit 700 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In use, images captured by the video camera may for example be incorporated within a game or interpreted as game control inputs. In another embodiment the camera is an infrared camera suitable for detecting infrared light.

In general, in order for successful data communication to occur with a peripheral device such as a video camera or remote control via one of the communication ports of the system unit 700, an appropriate piece of software such as a device driver should be provided. Device driver technology is well-known and will not be described in detail here, except to say that the skilled man will be aware that a device driver or similar software interface may be required in the present embodiment described.

The aforementioned system devices, including a console device and a portable handheld device, constitute means for enabling the handheld device to display and capture video of an interactive session of an interactive application presented on a main display. The console device constitutes means for initiating the interactive session of the interactive application, the interactive session defining interactivity between a user and the interactive application. The system devices constitute means for determining an initial position and orientation of the handheld device operated by a spectator. The console device constitutes means for determining a current state of the interactive application based on the interactivity between the user and the interactive application. The system devices constitute means for tracking the position and orientation of the handheld device during the interactive session. The system devices constitute means for generating a spectator video stream of the interactive session based on the current state of the interactive application and the tracked position and orientation of the handheld device. The handheld device constitutes means for rendering the spectator video stream on a handheld display of the handheld device.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data maybe processed by other computers on the network, e.g., a cloud of computing resources.

The embodiments of the present invention can also be defined as a machine that transforms data from one state to another state. The transformed data can be saved to storage and then manipulated by a processor. The processor thus transforms the data from one thing to another. Still further, the methods can be processed by one or more machines or processors that can be connected over a network. Each machine can transform data from one state or thing to another, and can also process data, save data to storage, transmit data over a network, display the result, or communicate the result to another machine.

One or more embodiments of the present invention can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for enabling a handheld device to capture video of an interactive session of an interactive application presented on a main display, the method comprising:
    initiating the interactive session of the interactive application, the interactive session defining interactivity between a user and the interactive application;
    determining an initial position and orientation of a handheld device operated by a spectator;
    determining a current state of the interactive application based on the interactivity between the user and the interactive application;
    tracking the position and orientation of the handheld device during the interactive session;
    generating a spectator video stream of the interactive session based on the current state of the interactive application and the tracked position and orientation of the handheld device;
    rendering the spectator video stream on a handheld display of the handheld device wherein the position and orientation of the handheld device define a position and orientation of a virtual viewpoint within a virtual space defined by the interactive application; and
    wherein the spectator video stream includes images of the virtual space captured from the perspective of the virtual viewpoint.

2. The method of claim 1, wherein the interactive session includes receiving interactive input from a controller device operated by the user, the interactive input being utilized to determine the current state of the interactive application.

3. The method of claim 1, further comprising,
    generating an application video stream based on the current state of the interactive application;
    rendering the application video stream on the main display;
    wherein the interactive session defines interactivity between the user and the rendered application video stream.

4. The method of claim 1, further comprising,
    transmitting the spectator video stream from the interactive application to the handheld device so as to enable the rendering of the spectator video stream on the handheld display of the handheld device.

5. The method of claim 1, further comprising,
    capturing an environmental video stream of an interactive environment in which the interactivity between the user and the interactive application occurs;
    wherein the spectator video stream is generated based on the environmental video stream.

6. The method of claim 5, wherein the spectator video stream is generated by augmenting the environmental video stream with a virtual element.

7. The method of claim 1, further comprising,
    determining an initial position of the user;
    tracking the position of the user during the interactive session;
    wherein the spectator video stream is generated based on the position and orientation of the handheld device relative to the position of the user.

8. The method of claim 7, wherein the position of the user is determined based on the position of a controller device operated by the user.

9. The method of claim 1, further comprising,
    storing the spectator video stream in a memory.

10. A method for enabling a handheld device to capture video of an interactive session of an interactive application presented on a main display, the method comprising:
    initiating the interactive session of the interactive application, the interactive session defining interactivity between a user and the interactive application;
    determining an initial position and orientation of a handheld device operated by a spectator;
    determining a current state of the interactive application based on the interactivity between the user and the interactive application;
    tracking the position and orientation of the handheld device during the interactive session;
    generating a spectator video stream of the interactive session based on the current state of the interactive application and the tracked position and orientation of the handheld device;
    rendering the spectator video stream on a handheld display of the handheld device;
    determining application state data based on the current state of the interactive application;
    transmitting the application state data to the handheld device;
    wherein the spectator video stream is generated at the handheld device based on the application state data and the tracked position and orientation of the handheld device.

11. A method for enabling a handheld device to capture video of an interactive session of an interactive application presented on a main display, the method comprising:
    initiating the interactive session of the interactive application, the interactive session defining interactivity between a user and the interactive application;
    determining an initial position and orientation of a handheld device operated by a spectator;
    determining a current state of the interactive application based on the interactivity between the user and the interactive application;
    tracking the position and orientation of the handheld device during the interactive session;
    generating a spectator video stream of the interactive session based on the current state of the interactive application and the tracked position and orientation of the handheld device;
    rendering the spectator video stream on a handheld display of the handheld device;
    capturing an environmental video stream of an interactive environment in which the interactivity between the user and the interactive application occurs;
    wherein the spectator video stream is generated based on the environmental video stream;
    wherein the spectator video stream is generated by augmenting the environmental video stream with a virtual element;

wherein the generating of the spectator video stream includes,
  detecting the user within the environmental video stream, and
  replacing at least a portion of the detected user in the environmental video stream with a virtual element.

12. The method of claim 11, wherein the replacing includes replacing the detected user in the environmental video stream with a character of the interactive application controlled by the user.

13. A method for enabling a handheld device to capture video of an interactive session of an interactive application presented on a main display, the method comprising:
  initiating the interactive session of the interactive application, the interactive session defining interactivity between a user and the interactive application;
  determining an initial position and orientation of a handheld device operated by a spectator;
  determining a current state of the interactive application based on the interactivity between the user and the interactive application;
  tracking the position and orientation of the handheld device during the interactive session;
  generating a spectator video stream of the interactive session based on the current state of the interactive application and the tracked position and orientation of the handheld device;
  rendering the spectator video stream on a handheld display of the handheld device;
  determining an initial position of the user;
  tracking the position of the user during the interactive session;
  wherein the spectator video stream is generated based on the position and orientation of the handheld device relative to the position of the user;
  mapping an object within a virtual environment of the interactive application to the position of the user;
  wherein the position and orientation of the handheld device relative to the position of the user define a position and orientation of a virtual viewpoint within a virtual space defined by the interactive application; and
  wherein the spectator video stream includes images of the virtual space captured from the perspective of the virtual viewpoint, the object being included in the images of the spectator video stream when the handheld device is oriented towards the position of the user.

14. The method of claim 13, wherein the object is controlled by the user.

15. The method of claim 14, wherein the object is a character of the interactive application.

16. The method of claim 13, further comprising,
  capturing an environmental video stream of an interactive environment in which the interactivity between the user and the interactive application occurs;
  wherein the position of the user and the position and orientation of the handheld device relative to the position of the user are determined at least in part based on the environmental video stream.

17. A system for capturing video of an interactive session of an interactive application presented on a main display, the system comprising:
  (a) a device for presenting the interactive application, the device including,
    (i) a session module for initiating the interactive session of the interactive application, the interactive session defining interactivity between a user and the interactive application,
    (ii) a handheld device module for determining and tracking a position and orientation of a handheld device operated by a spectator during the interactive session,
    (iii) a spectator video stream module for generating a spectator video stream of the interactive session based on a current state of the interactive application and the tracked position and orientation of the handheld device; and
  (b) a handheld device, the handheld device including a handheld display for rendering the spectator video stream;
  wherein the position and orientation of the handheld device define a position and orientation of a virtual viewpoint within a virtual space defined by the interactive application; and
  wherein the spectator video stream includes images of the virtual space captured from the perspective of the virtual viewpoint.

18. The system of claim 17, further comprising,
  (c) a controller device operated by the user, the controller device providing interactive input, the interactive input being utilized to determine the current state of the interactive application.

19. The system of claim 17, wherein the device further includes an application video stream module for generating an application video stream based on the current state of the interactive application and rendering the application video stream on the main display;
  wherein the interactive session defines interactivity between the user and the rendered application video stream.

20. The system of claim 17, wherein the spectator video stream module transmits the spectator video stream from the interactive application to the handheld device so as to enable the rendering of the spectator video stream on the handheld display of the handheld device.

21. The system of claim 17, wherein the handheld device further includes an image capture device for capturing an environmental video stream of an interactive environment in which the interactivity between the user and the interactive application occurs; and
  wherein the spectator video stream module generates the spectator video stream based on the environmental video stream.

22. The system of claim 21, wherein the spectator video stream module generates the spectator video stream by augmenting the environmental video stream with a virtual element.

23. The system of claim 17, further comprising a user tracking module, the user tracking module determining an initial position of the user and tracking the position of the user during the interactive session; and
  wherein the spectator video stream module generates the spectator video stream based on the position and orientation of the handheld device relative to the position of the user.

24. The system of claim 23, wherein the position of the user is determined based on the position of a controller device operated by the user.

25. The system of claim 17, wherein the handheld device includes a memory for storing the spectator video stream.

26. A system for capturing video of an interactive session of an interactive application presented on a main display, the system comprising:

(a) a device for presenting the interactive application, the device including,
  (i) a session module for initiating the interactive session of the interactive application, the interactive session defining interactivity between a user and the interactive application,
  (ii) a handheld device module for determining and tracking a position and orientation of a handheld device operated by a spectator during the interactive session,
  (iii) a spectator video stream module for generating a spectator video stream of the interactive session based on a current state of the interactive application and the tracked position and orientation of the handheld device; and
(b) a handheld device, the handheld device including a handheld display for rendering the spectator video stream;
wherein the handheld device further includes an image capture device for capturing an environmental video stream of an interactive environment in which the interactivity between the user and the interactive application occurs; and
wherein the spectator video stream module generates the spectator video stream based on the environmental video stream;
wherein the spectator video stream module generates the spectator video stream by augmenting the environmental video stream with a virtual element;
wherein the spectator video stream module generates the spectator video stream by detecting the user within the environmental video stream, and replacing at least a portion of the detected user in the environmental video stream with a virtual element.

27. The system of claim 26, wherein the replacing includes replacing the detected user in the environmental video stream with a character of the interactive application controlled by the user.

28. A system for capturing video of an interactive session of an interactive application presented on a main display, the system comprising:
(a) a device for presenting the interactive application, the device including,
  (i) a session module for initiating the interactive session of the interactive application, the interactive session defining interactivity between a user and the interactive application,
  (ii) a handheld device module for determining and tracking a position and orientation of a handheld device operated by a spectator during the interactive session,
  (iii) a spectator video stream module for generating a spectator video stream of the interactive session based on a current state of the interactive application and the tracked position and orientation of the handheld device; and
(b) a handheld device, the handheld device including a handheld display for rendering the spectator video stream;
a user tracking module, the user tracking module determining an initial position of the user and tracking the position of the user during the interactive session; and
wherein the spectator video stream module generates the spectator video stream based on the position and orientation of the handheld device relative to the position of the user;
wherein the interactive application maps an object within a virtual environment of the interactive application to the position of the user;
wherein the position and orientation of the handheld device relative to the position of the user define a position and orientation of a virtual viewpoint within a virtual space defined by the interactive application; and
wherein the spectator video stream includes images of the virtual space captured from the perspective of the virtual viewpoint, the object being included in the images of the spectator video stream when the handheld device is oriented towards the position of the user.

29. The system of claim 28, wherein the object is controlled by the user.

30. The system of claim 29, wherein the object is a character of the interactive application.

31. The system of claim 28,
wherein the handheld device includes an image capture device for capturing an environmental video stream of an interactive environment in which the interactivity between the user and the interactive application occurs;
wherein the position of the user and the position and orientation of the handheld device relative to the position of the user are determined at least in part based on the environmental video stream.

* * * * *